(12) United States Patent
Kataoka

(10) Patent No.: US 6,553,183 B1
(45) Date of Patent: Apr. 22, 2003

(54) RECORDING APPARATUS FOR PERFORMING HIERARCHICAL OVERWRITE RECORDING OF VIDEO AND/OR AUDIO DATA TO A RECORDING MEDIUM

(75) Inventor: Mitsuteru Kataoka, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/250,606

(22) Filed: Feb. 17, 1999

(30) Foreign Application Priority Data

Feb. 17, 1998 (JP) .......................................... 10-034486

(51) Int. Cl.⁷ .............................................. H04N 5/917
(52) U.S. Cl. ........................ 386/112; 386/124; 704/201
(58) Field of Search ................................ 386/109, 112, 386/113, 124, 96, 46, 33, 35; 348/421.1; 704/229, 201, 228; H04N 5/917

(56) References Cited

U.S. PATENT DOCUMENTS

| 5,495,552 A | * | 2/1996 | Sugiyama et al. | .......... 704/201 |
| 5,758,315 A | * | 5/1998 | Mori | .......................... 704/229 |
| 5,973,745 A | * | 10/1999 | Kondo | .................... 348/421.1 |
| 6,301,558 B1 | * | 10/2001 | Isozaki | ....................... 704/228 |

FOREIGN PATENT DOCUMENTS

| GB | 2334370 | * | 8/1999 | ........... G11B/20/10 |
| JP | 6-259099 | | 9/1994 | |

* cited by examiner

Primary Examiner—Vincent Boccio
(74) Attorney, Agent, or Firm—Wenderoth, Lind & Ponack, L.L.P.

(57) ABSTRACT

An object of the present invention is to provide a recording device for hierarchical overwrite recording of video and/or audio data to a recording disc without an accompanying complicated mechanical operation. To achieve the object, a block generator generates blocks of a uniform size from data belonging to hierarchical layers produced by the hierarchical coding operation of a hierarchical encoder. A recording controller controls a recorder to record the blocks generated by the block generator in a linear consecutive sequence to the recording disc until the recording disc becomes full. After the recording disc becomes full, the recording controller selects lower layer blocks from the blocks generated by the block generator, selects higher layer blocks from the block sequence on the recording disc, and controls the recorder to record the selected lower layer blocks by overwriting them to the selected higher layer blocks in sequence starting from a block near the beginning of the block sequence.

24 Claims, 19 Drawing Sheets

F I G. 2
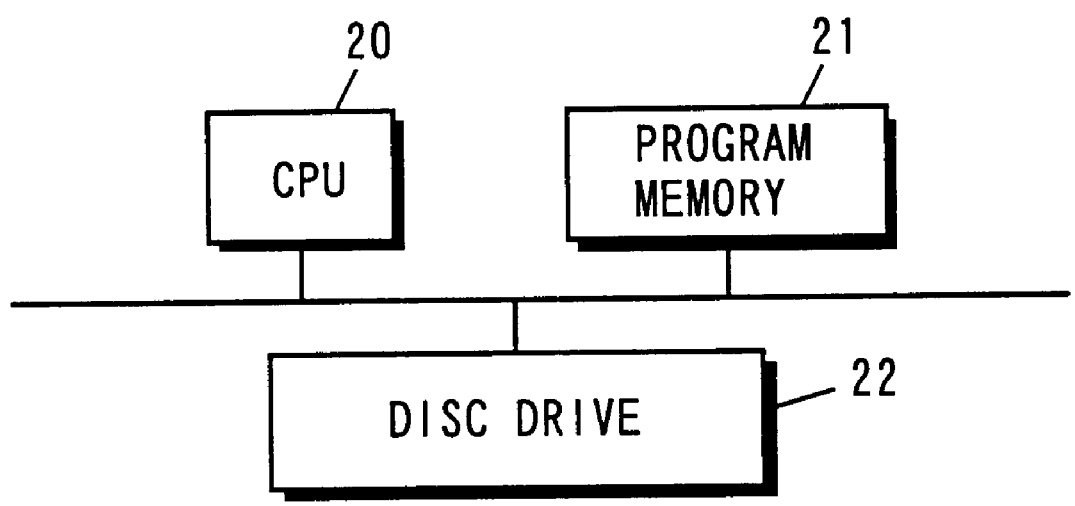

FIG. 8

| RECORDING STAGE | BLOCKS/ CYCLE | OVERWRITE BLOCK(S) |
|---|---|---|
| 2 | 2 | 2 |

FIG. 9

| RECORDING STAGE | BLOCKS/ CYCLE | OVERWRITE BLOCK(S) |
|---|---|---|
| 2 | 6 | 4 ~ 6 |
| 3 | 6 | 3, 6 |

FIG. 10

| RECORDING STAGE | BLOCKS/ CYCLE | OVERWRITE BLOCK(S) |
|---|---|---|
| 2 | 12 | 7 ~ 12 |
| 3 | 12 | 5, 6, 11, 12 |
| 4 | 12 | 4, 10, 12 |

FIG. 21

| RECORDING STAGE | BLOCKS/CYCLE | OVERWRITE BLOCK(S) |
|---|---|---|
| 2 | 12 | 7~12 |
| 3 | 12 | 5, 6, 11, 12 |
| 4 | 12 | 4, 10, 12 |

FIG. 22

| RECORDING STAGE | BLOCKS/CYCLE | OVERWRITE BLOCK(S) |
|---|---|---|
| 2 | 2 | 2 |
| 3 | 6 | 3, 6 |
| 4 | 12 | 4, 7, 12 |

FIG. 23

| RECORDING STAGE | BLOCKS/CYCLE | OVERWRITE BLOCK(S) |
|---|---|---|
| 2 | 2 | 2 |
| 3 | 4 | 3 |
| 4 | 4 | 4 |

RECORDING APPARATUS FOR PERFORMING HIERARCHICAL OVERWRITE RECORDING OF VIDEO AND/OR AUDIO DATA TO A RECORDING MEDIUM

BACKGROUND OF THE INVENTION

1. Field of the Invention

The present invention relates to a video and/or audio recording apparatus, and more specifically relates to a digital video and/or audio recording apparatus for recording video and/or audio data to a recording device.

2. Description of the Background Art

Conventionally, digital audio recording devices for recording music and other audio data include the Digital Audio Tape (DAT) recorder, and, more recently, audio recording devices using the Mini Disc (MD) recording medium. Audio recorders using the CD-R (Compact Disc-Recordable) medium have also been developed and are currently available.

Digital video recording devices for recording movies and other moving picture data (including the associated audio data) include recording devices using the Digital Video Cassette (DVC) medium. Video recorders using the DVD-RAM (Digital Versatile Disc-RAM) medium are also being developed.

Audio recording devices using semiconductor memory are also used in answering machines and similar devices, while video recording devices for recording still picture similarly using semiconductor memory are used in digital cameras.

Such conventional video and/or audio recording devices record the video and/or audio data to a recording medium having a finite capacity, which varies depending upon the device. A problem with such devices, therefore, is that when the recording medium becomes filled to capacity while recording is in progress, an interruption occurs in video and/or audio reproduction.

This problem is addressed in many such devices by, for example, enabling the user to select a "standard" or "long play" mode to change the total recordable time of the medium. This causes the recording device to change the compression rate used for video and/or audio encoding according to the user-selected recording mode and the writing speed to the physical media, thus changing the effective recording time.

Even with this method, however, there is no change in the fact that the maximum recording time is predetermined, and the above-described problem is not truly resolved.

Japanese Patent Laying-Open No. 6-259099 (1994) teaches an audio recording apparatus for hierarchically coding and recording audio data to semiconductor memory.

FIG. 24 is a block diagram showing the major parts in a conventional audio recording apparatus as taught in the above-noted Patent Application Publication (referred to below as the conventional audio recording apparatus). As will be known from FIG. 24, this conventional audio recording apparatus comprises: a hierarchical encoder 240 for hierarchically encoding audio data supplied thereto; recording unit 242 for recording data output from the hierarchical encoder 240 to the semiconductor memory 241, which is integral to the recording unit 242; and a recording controller 244 having a recording management database 243, which it uses for controlling the recording unit 242.

The operation of the above-described conventional audio recording apparatus is described next below with reference to FIG. 24.

The hierarchical encoder 240 first hierarchically codes audio data input thereto. That is, the hierarchical encoder 240 codes the audio data using an orthogonal transformation or subband coding method, divides it into a plurality of frequency bands, and hierarchizes the frequency bands (that is, assigns a priority level to the frequency bands) such that a low frequency band is assigned to a low hierarchical layer (a high priority level), and a high frequency band is assigned to a high hierarchical layer (a low priority level). Alternatively, frequency bands that are audibly difficult to discern are assigned to a high hierarchical layer for masking.

The recording unit 242 then records the data output from the hierarchical encoder 240 to the semiconductor memory 241 in which the data is divided into groups of blocks in each hierarchized layer.

The recording controller 244 monitors the recording unit 242 during this process to measure the amount of data recorded to the semiconductor memory 241, detects where in the semiconductor memory 241 the data (code blocks) for each layer is stored, and generate to hold a recording management database 243 indicating this detected address information. The amount of data stored to the semiconductor memory 241 and the capacity of the semiconductor memory 241 are compared, and when the recorded data exceeds the available capacity, the recording controller 244 controls the recording unit 242 as follows.

When the data to be recorded exceeds the storage capacity of the semiconductor memory 241, the recording controller 244 refers to the recording management database 243 described above and instructs the recording unit 242 to continue recording data output from the hierarchical encoder 240 by overwriting data to an address in the semiconductor memory 241 where data associated with a higher layer is recorded. As a result, output data from the hierarchical encoder 240 continues to be recorded to the semiconductor memory 241 while leaving intact the lower layer data that was recorded before the storage capacity of the semiconductor memory was exceeded.

It should be noted that audio data recorded as described above to the semiconductor memory 241 can be reproduced by again referring to the recording management database 243 stored by the recording controller 244 to first read and decode lower layer data recorded before the semiconductor memory storage capacity was exceeded, and then read and decode data recorded after the storage capacity was exceeded.

This is because lower layer data can be decoded with reference only to, that lower layer, but higher layer data must be decoded with reference to a lower layer. Therefore, even if a higher layer is lost due to data overwriting, the remaining lower layer data can still be decoded. (It should be noted, however, that the sound quality of the reproduced audio drops because of high frequency band elimination.)

As described above, the conventional audio recording apparatus hierarchically codes audio data supplied thereto for recording to semiconductor memory 241. When the semiconductor memory 241 becomes full, audio data is recorded by overwriting previously recorded data from a high hierarchical layer. This method is referred to below as "hierarchical overwrite recording." As a result, recording continues even when the semiconductor memory 241 becomes full, and there is, therefore, no interruption in the reproduced audio. Furthermore, if recording is completed before the semiconductor memory 241 is filled, high quality audio can be reproduced.

However, semiconductor memory 241 typically does not have enough capacity for practical use as a video and/or audio data recording medium. Applications for such conventional audio recording apparatuses are therefore limited to applications having a relatively short recording time and not requiring particularly high sound quality, including, for example, answering machines as noted above, recorders for language study practice (such as English conversation as a second language), and toys (such as a toy parrot) for mimicking a person's voice.

The present inventors therefore invented a method for realizing the above-noted hierarchical overwrite recording method using a large capacity, random access, disc-type recording medium (such as a floppy disk, fixed disk, MD, CD, or DVD; such media are below referred to as "recording disks").

Using this method, it is possible to record video and/or audio data for a movie or music for which both a long recording time and high quality reproduction are required without the reproduced video and/or audio being interrupted when the recording disk becomes full during recording. In addition, if recording is completed before the recording disk is filled, recording can be completed so that the recorded video and/or audio data can be reproduced with high quality.

It should be further noted, however, that recording data to a disk generally involves some mechanical operation, such as moving the recording head and spinning the recording disc. As a result, the seek time is long compared to a semiconductor memory 241. Because the above-noted conventional audio recording apparatus uses a semiconductor memory 241, however, the seek time is so short that it can be effectively ignored, and no particular considerations are therefore taken with respect to the seek time.

The following problems can therefore result when recording video and/or audio data to a recording disc using a method such as that employed in the above-noted semiconductor memory-based conventional audio recording apparatus. That is, if the input data is recorded by overwriting previously recorded data associated with a higher layer, the complicated mechanical operation required to access the overwrite address can incur a long seek time depending upon where the data to be overwritten is recorded. As a result, a delay can occur in the recording process. Furthermore, even if a delay in the recording process does not result, power consumption is increased by the mechanical operation.

In addition, when the above-noted conventional audio recording apparatus writes twice, for example, the reproduced sound quality in the first and second parts of a recording will not necessarily be the same. This is also true when data is written three times, that is, the sound quality will not necessarily be the same in the beginning, middle, and end parts of a recording.

SUMMARY OF THE INVENTION

Therefore, an object of the present invention is to provide a video and/or audio recording apparatus and method for hierarchical overwrite recording of video and/or audio data using a recording disc without an accompanying complicated mechanical operation.

A further object of the present invention is to provide a video and/or audio recording apparatus and method whereby video and/or audio data recorded to a recording disc by means of hierarchical overwrite recording can be recorded so that, when data is recorded to a first recording stage from the start of recording until the disc is full, and is thereafter recorded to a $\gamma$th recording stage (where $\gamma=2, 3, \ldots$), the quality of the reproduced video and/or audio gradually deteriorates as hierarchical overwrite recording progresses from recording stage 1 to recording stage 2, recording stage 3, and so forth, and the quality of the reproduced video and/or audio corresponding to recording stage 1 to recording stage $\gamma$ is the same when hierarchical overwrite recording ends at recording stage $\gamma$.

A first aspect of the present invention is directed to a video and/or audio recording apparatus for recording input video and/or audio data, comprising:

a hierarchical coding means for hierarchically coding input video and/or audio data so that data in a bottom layer is independently decoded, and data in a layer other than the bottom layer is decoded by referring to lower layers;

a block generating means for generating a plurality of blocks of a uniform size from data in each hierarchically coded layer obtained by the hierarchical coding means;

a recording means for recording a block generated by the block generating means to a recording medium, the recording medium being rewritable, randomly accessible, accompanied by mechanical operation in recording, and contained in the recording means; and a recording control means for controlling the recording means;

wherein the recording control means:

until the recording medium becomes full, controls the recording means to record a plurality of blocks generated by the block generating means to the recording medium so that blocks are arranged in a linear and consecutive sequence; and after the recording medium becomes full:

selects a plurality of lower layer blocks as blocks to be recorded from blocks generated by the block generating means;

selects a plurality of higher layer blocks from a block sequence on the recording medium as blocks to be overwritten; and controls the recording means to record a lower layer block to be recorded by overwriting to a higher layer block to be overwritten in sequence from a block near a beginning of the block sequence By means of this first aspect of the invention, it is possible, using a rewritable and randomly accessible recording medium which is accompanied by mechanical operation in recording, to record video and/or audio data by means of hierarchical overwrite recording without an accompanying complicated mechanical operation.

A second aspect of the present invention is directed to a video and/or audio recording apparatus according to the first aspect of the invention, wherein the recording control means:

controls the recording means to record a plurality of blocks in a predetermined hierarchical sequence when recording blocks generated by the block generating means; and when selecting a higher layer block from a block sequence on the recording medium as a block to be overwritten, refers to an overwrite block table, the overwrite block table recording a location of a block to be overwritten in block sequence.

By thus holding an overwrite block table in which the overwrite block locations in the block sequence are recorded, it is possible by means of this second aspect of the invention to easily select the overwrite blocks by referring to this overwrite block table.

A third aspect of the present invention is directed to a video and/or audio recording apparatus according to the second aspect of the invention, wherein the predetermined sequence has a cycle; and the overwrite block table records a location of a block to be overwritten in one cycle.

By means of this third aspect of the invention, it becomes sufficient to store a small overwrite block table recording information for only one block cycle.

A fourth aspect of the present invention is directed to a video and/or audio recording apparatus according to the first aspect of the invention, wherein the recording control means:

controls the recording means to record a plurality of blocks in a sequence of $\beta$ block cycles in a first recording stage until the recording medium becomes full, where $\beta$ is the least common multiple of $\{\alpha, \alpha-1, \alpha-2, \ldots, 2\}$ and $\alpha$ is a desirable constant integer value of two or greater; and in a $\gamma$th recording stage (where $\gamma=2, 3, \ldots, \alpha$) after the recording medium becomes full:

selects a block from layer 1 to layer $(\beta/\gamma)$ when selecting a lower layer block as a block to be recorded from blocks generated by the block generating means;

selects a block from layer $(\beta/\gamma+1)$ to layer $(\beta/(\gamma-1))$ when selecting a higher layer block from a block sequence on the recording medium as a block to be overwritten; and when recording the lower layer block to be recorded by overwriting to the higher layer block to be overwritten in sequence from a block near a beginning of the block sequence, controls the recording means to record the layer 1 to layer $(\beta/\gamma)$ blocks by overwriting to the layer $(\beta/\gamma+1)$ to layer $(\beta/(\gamma-1))$ blocks in a sequence of $(\beta/\gamma)$ block cycles.

By means of this fourth aspect of the invention, the block sequence on the recording medium when recording stage $\gamma$ is completed evenly contains blocks recorded in recording stage 1 to recording stage $\gamma$.

It is therefore possible to record video and/or audio data such that the quality of the reproduced video and/or audio gradually deteriorates as hierarchical overwrite recording thus progresses from recording stage 1 to recording stage 2 and recording stage $\alpha$, and the quality of the reproduced video and/or audio is the same in every recording stage irrespective of the recording stage at which hierarchical overwrite recording ends in the range recording stage 2 to recording stage $\alpha$. In other words, if hierarchical overwrite recording ends at recording stage $\gamma$, the quality of the video and/or audio reproduced for recording stage 1 to recording stage $\gamma$ will be same for every stage.

A fifth aspect of the present invention is directed to a video and/or audio recording apparatus for recording input video and/or audio data, comprising:

a hierarchizing means for hierarchizing input video and/or audio data so that data of a highest priority is hierarchized to a bottom layer, and as data priority decreases, the data is hierarchized to a higher layer;

a block generating means for generating a plurality of blocks of a uniform size from data in each hierarchized layer obtained by the hierarchizing means;

a recording means for recording a block generated by the block generating means to a recording medium, the recording medium being rewritable, randomly accessible, accompanied by mechanical operation in recording, and contained in the recording means; and recording control means for controlling the recording means;

wherein the recording control means:

until the recording medium becomes full, controls the recording means to record a plurality of blocks generated by the block generating means to the recording medium so that blocks are arranged in a linear and consecutive sequence; and after the recording medium becomes full:

selects a lower layer block as a block to be recorded from blocks generated by the block generating means;

selects a higher layer block from a block sequence on the recording medium as a block to be overwritten; and controls the recording means to record a lower layer block to be recorded by overwriting to a higher layer block to be overwritten in sequence from a block near a beginning of the block sequence.

By means of this fifth aspect of the invention, it is possible, using a rewritable, randomly accessible recording medium which is accompanied by mechanical operation in recording, to record video and/or audio data by means of hierarchical overwrite recording without an accompanying complicated mechanical operation.

A sixth aspect of the present invention is directed to a video and/or audio recording apparatus according to the fifth aspect of the invention, wherein the recording control means:

controls the recording means to record blocks in a predetermined hierarchical sequence when recording blocks generated by the block generating means; and when selecting a higher layer block from a block sequence on the recording medium as a block to be overwritten, refers to an overwrite block table, the overwrite block table recording a location of a block to be overwritten in block sequence.

By thus storing an overwrite block table in which the overwrite block locations in the block sequence are recorded, it is possible by means of this sixth aspect of the invention to easily select the overwrite blocks by referring to this overwrite block table.

A seventh aspect of the present invention is directed to a video and/or audio recording apparatus according to the sixth aspect of the invention, wherein the predetermined sequence has a cycle; and the overwrite block table records a location of a block to be overwritten in one cycle.

By means of this seventh aspect of the invention, it becomes sufficient to store a small overwrite block table recording information for only one block cycle.

An eighth aspect of the present invention is directed to a video and/or audio recording apparatus according to the fifth aspect of the invention, wherein the recording control means:

controls the recording means to record a plurality of blocks in a sequence of $\beta$ block cycles in a first recording stage until the recording medium becomes full, where $\beta$ is the least common multiple of $\{\alpha, \alpha-1, \alpha-2, \ldots, 2\}$ and $\alpha$ is a desirable constant integer value of two or greater; and in a $\gamma$th recording stage (where $\gamma=2, 3, \ldots, \alpha$) after the recording medium becomes full:

selects a block from layer 1 to layer (β/γ) when selecting a lower layer block as a block to be recorded from blocks generated by the block generating means;

selects a block from layer (β/γ+1) to layer (β/(γ−1)) when selecting a higher layer block from a block sequence on the recording medium as a block to be overwritten; and when recording the lower layer block to be recorded by overwriting to a higher layer block to be overwritten in sequence from a block near a beginning of the block sequence, controls the recording means to record the layer 1 to layer (β/γ) blocks by overwriting to the layer (β/γ+1) to layer (β/(γ−1)) blocks in a sequence of (β/γ) block cycles.

By means of this eighth aspect of the invention, the block sequence on the recording medium when recording stage γ is completed evenly contains blocks recorded in recording stage 1 to recording stage γ.

It is therefore possible to record video and/or audio data such that the quality of the reproduced video and/or audio gradually deteriorates as hierarchical overwrite recording thus progresses from recording stage 1 to recording stage 2 and recording stage α, and the quality of the reproduced video and/or audio is the same in every recording stage irrespective of the recording stage at which hierarchical overwrite recording ends in the range recording stage 2 to recording stage α. In other words, if hierarchical overwrite recording ends at recording stage γ, the quality of the video and/or audio reproduced for recording stage 1 to recording stage γ will be same for every stage.

A ninth aspect of the present invention is directed to a video and/or audio recording apparatus for recording input video and/or audio data, comprising:

a block generating means for generating a plurality of blocks of a uniform size from input video and/or audio data;

a recording means for recording a block generated by the block generating means to a recording medium, the recording medium being rewritable, randomly accessible, accompanied by mechanical operation in recording, and contained in the recording means; and a recording control means for controlling the recording means;

wherein the recording control means:

until the recording medium becomes full, controls the recording means to record a plurality of blocks generated by the block generating means to the recording medium so that blocks are arranged in a linear and consecutive sequence; and after the recording medium becomes full:

selects a block to be recorded from blocks generated by the block generating means;

selects a block from a block sequence on the recording medium as a block to be overwritten; and controls the recording means to record a block to be recorded by overwriting to a block to be overwritten in sequence from a block near a beginning of the block sequence.

By means of this ninth aspect of the invention, it is possible, using a rewritable, randomly accessible recording medium which is accompanied by mechanical operation in recording, to record video and/or audio data by means of fragmented overwrite recording without an accompanying complicated mechanical operation.

A tenth aspect of the present invention is directed to a video and/or audio recording apparatus according to the ninth aspect of the invention, wherein the recording control means, when selecting a block from a block sequence on the recording medium as a block to be overwritten, refers to an overwrite block table, the overwrite block table recording a location of a block to be overwritten in block sequence.

By thus storing an overwrite block table in which the overwrite block locations in the block sequence are recorded, it is possible by means of this tenth aspect of the invention to easily select the overwrite blocks by referring to this overwrite block table.

An eleventh aspect of the present invention is directed to a video and/or audio recording apparatus according to the tenth aspect of the invention, wherein the location of a block to be overwritten has a cycle; and the overwrite block table records a location of a block to be overwritten in one cycle.

By means of this eleventh aspect of the invention, it becomes sufficient to store a small overwrite block table recording information for only one block cycle.

A twelfth aspect of the present invention is directed to a video and/or audio recording apparatus according to the ninth aspect of the invention, wherein when selecting a block from a block sequence on the recording medium as a block to be overwritten in a γth recording stage (where γ=2, 3, . . . , α; and α is a desirable constant integer value of two or greater) after the recording medium becomes full in a first recording stage, the recording control means selects a total of (β/γ) blocks, including (β/(γ(γ−1))) blocks recorded in each recording stage 1 to (γ−1) as overwrite blocks in each cycle of β blocks, where β is at least common multiple of {α, α−1, α−2, . . . , 2}.

A thirteenth aspect of the present invention is directed to a video and/or audio recording apparatus according to the ninth aspect of the invention, wherein when selecting a block from a block, seqence on the recording medium as a block to be overwritten in a γth recording stage (where γ=2, 3, . . . , α; and α is a desirable constant integer value of two or greater) after the recording medium becomes full in a first recording stage, the recording control means selects a total of (γ−1) blocks, including 1 block in each recording stage 1 to (γ−1) as overwrite blocks in each cycle of blocks, where the number of blocks in each cycle is equal to the least common multiple of {α, α−1, α−2, . . . , 2}.

By means of the twelfth and thirteenth aspects of the invention, the block sequence on the recording medium when recording stage γ is completed evenly contains blocks recorded in recording stage 1 to recording stage γ.

It is therefore possible to record video and/or audio data such that the quality of the reproduced video and/or audio gradually deteriorates as fragmented overwrite recording thus progresses from recording stage 1 to recording stage 2 and recording stage α, and the quality of the reproduced video and/or audio is the same in every recording stage irrespective of the recording stage at which fragmented overwrite recording ends in the range recording stage 2 to recording stage α. In other words, if fragmented overwrite recording ends at recording stage γ, the quality of the video and/or audio reproduced for recording stage 1 to recording stage γ will be same for every stage.

A fourteenth aspect of the present invention is directed to a method for recording input video and/or audio data, comprising the following steps:

a hierarchical coding step for hierarchically coding input video and/or audio data so that data in a bottom layer is independently decoded, and data in a layer other than the bottom layer is decoded by referring to lower layers;

a block generating step for generating a plurality of blocks of a uniform size from data in each hierarchically coded layer; and a recording step for recording a generated block to a recording medium, which is rewritable, randomly accessible, and accompanied by mechanical operation in recording;

wherein the recording step for recording a generated block to the recording medium:

records a plurality of generated blocks to the recording medium so that blocks are arranged in a linear and consecutive sequence until the recording medium becomes full; and after the recording medium becomes full:

selects a lower layer block as a block to be recorded from generated blocks;

selects a higher layer block from a block sequence on the recording medium as a block to be overwritten; and records a lower layer block to be recorded by overwriting to a higher layer block to be overwritten in sequence from a block near a beginning of the block sequence.

By means of this fourteenth aspect of the invention, it is possible to record video and/or audio data by means of hierarchical overwrite recording to a recording medium without an accompanying complicated mechanical operation.

A fifteenth aspect of the present invention is directed to a method for recording input video and/or audio data, comprising the following steps:

a hierarchizing step for hierarchizing input video and/or audio data so that data of a highest priority is hierarchized to a bottom layer, and as data priority decreases, the data is hierarchized to a higher layer;

a block generating step for generating a plurality of blocks of a uniform size from data in each hierarchized layer; and a recording step for recording a generated block to a recording medium, which is rewritable, randomly accessible, and accompanied by mechanical operation in recording;

wherein the recording step for recording a generated block to the recording medium:

records a plurality of generated blocks to the recording medium so that blocks are arranged in a linear and consecutive sequence until the recording medium becomes full; and after the recording medium becomes full:

selects a lower layer block as a block to be recorded from generated blocks;

selects a higher layer block from a block sequence on the recording medium as a block to be overwritten; and records a lower layer block to be recorded by overwriting to a higher layer block to be overwritten in sequence from a block near a beginning of the block sequence.

By means of this fifteenth aspect of the invention, it is possible, using a rewritable, randomly accessible recording medium which is accompanied by mechanical operation in recording, to record video and/or audio data by means of hierarchical overwrite recording without an accompanying complicated mechanical operation.

A sixteenth aspect of the present invention is directed to a method for recording input video and/or audio data, comprising the following steps:

a block generating step for generating a plurality of blocks of a uniform size from input video and/or audio data; and a recording step for recording a generated block to a recording medium, which is rewritable, randomly accessible, and accompanied by mechanical operation in recording;

wherein the recording step for recording a generated block to the recording medium:

records a plurality of generated blocks to the recording medium so that blocks are arranged in a linear and consecutive sequence until the recording medium becomes full; and after the recording medium becomes full:

selects a block to be recorded from generated blocks;

selects a block from a block sequence on the recording medium as a block to be overwritten, and records a block to be recorded by overwriting to a block to be overwritten in sequence from a block near a beginning of the block sequence.

By means of this sixteenth aspect of the invention, it is possible to record video and/or audio data by means of fragmented overwrite recording to a recording medium without an accompanying complicated mechanical operation.

A seventeenth aspect of the present invention is directed to a recording medium for recording a computer-executable program for recording input video and/or audio data, the program achieving on the computer an operating environment comprising the following steps:

a hierarchical coding step for hierarchically coding input video and/or audio data so that data in a bottom layer is independently decoded, and data in a layer other than the bottom layer is decoded by referring to lower layers;

a block generating step for generating a plurality of blocks of a uniform size from data in each hierarchically coded layer; and a recording step for recording a generated block to a recording medium, which is rewritable, randomly accessible, and accompanied by mechanical operation in recording;

wherein the recording step for recording a generated block to the recording medium:

records a plurality of generated blocks to the recording medium so that blocks are arranged in a linear and consecutive sequence until the recording medium becomes full; and after the recording medium becomes full:

selects a lower layer block as a block to be recorded from generated blocks,;

selects a higher layer block from a block sequence on the recording medium as a block to be overwritten; and records a lower layer block to be recorded by overwriting to a higher layer block to be overwritten in sequence from a block near a beginning of the block sequence.

An eighteenth aspect of the present invention is directed to a recording medium for recording a computer-executable program for recording input video and/or audio data, the program achieving on the computer an operating environment comprising the following steps:

a hierarchizing step for hierarchizing input video and/or audio data so that data of a highest priority is hierarchized to a least significant layer, and as data priority decreases, the data is hierarchized to a higher layer;

a block generating step for generating a plurality of blocks of a uniform size from data in each hierarchized layer; and a recording step for recording a generated block to a recording medium, which is rewritable, randomly accessible, and accompanied by mechanical operation in recording;

wherein the recording step for recording a generated block to the recording medium:

records a plurality of generated blocks to the recording medium so that blocks are arranged in a linear and consecutive sequence until the recording medium becomes full; and after the recording medium becomes full:

selects a lower layer block as a block to be recorded from generated blocks,;

selects a higher layer block from a block sequence on the recording medium as a block to be overwritten; and records a lower layer block to be recorded by overwriting to a higher layer block to be overwritten in sequence from a block near a beginning of the block sequence.

A nineteenth aspect of the present invention is directed to a recording medium for recording a computer-executable program for recording input video and/or audio data, the program achieving on the computer an operating environment comprising the following steps:

a block generating step for generating a plurality of blocks of a uniform size from input video and/or audio data; and a recording step for recording a generated block to a recording medium, which is rewritable, randomly accessible, and accompanied by mechanical operation in recording;

wherein the recording step for recording a generated block to the recording medium:

records a plurality of generated blocks to the recording medium so that blocks are arranged in a linear and consecutive sequence until the recording medium becomes full; and after the recording medium becomes full:

selects a block to be recorded from generated blocks;

selects a block from a block sequence on the recording medium as a block to be overwritten; and records a block to be recorded by overwriting to a block to be overwritten in sequence from a block near a beginning of the block sequence.

A twentieth aspect of the present invention is directed to a program supply method for supplying over a network a computer-executable program for recording input video and/or audio data, the program achieving on the computer an operating environment comprising the following steps:

a hierarchical coding step for hierarchically coding input video and/or audio data so that data in a bottom layer is independently decoded, and data in a layer other than the bottom layer is decoded by referring to lower layers;

a block generating step for generating a plurality of blocks of a uniform size from data in each hierarchically coded layer; and a recording step for recording a generated block to a recording medium, which is rewritable, randomly accessible, and accompanied by mechanical operation in recording;

wherein the recording step for recording a generated block to the recording medium:

records a plurality of generated blocks to the recording medium so that blocks are arranged in a linear, consecutive sequence until the recording medium becomes full; and after the recording medium becomes full:

selects a lower layer block as a block to be recorded from generated blocks;

selects a higher layer block from a block sequence on the recording medium as a block to be overwritten; and records a lower layer block to be recorded by overwriting to a higher layer block to be overwritten in sequence from a block near a beginning of the block sequence.

A twenty-first aspect of the present invention is directed to a program supply method for supplying over a network a computer-executable program for recording input video and/or audio data, the program achieving on the computer an operating environment comprising the following steps:

a hierarchizing step for hierarchizing input video and/or audio data so that data of a highest priority is hierarchized to a bottom layer, and as data priority decreases, the data is hierarchized to a higher layer;

a block generating step for generating a plurality of blocks of a uniform size from data in each hierarchized layer; and a recording step for recording a generated block to a recording medium, which is rewritable, randomly accessible, and accompanied by mechanical operation in recording;

wherein the recording step for recording a generated block to the recording medium:

records a plurality of generated blocks to the recording medium so that blocks are arranged in a linear and consecutive sequence until the recording medium becomes full; and after the recording medium becomes full:

selects a lower layer block as a block to be recorded from generated blocks;

selects a higher layer block from a block sequence on the recording medium as a block to be overwritten; and records a lower layer block to be recorded by overwriting to a higher layer block to be overwritten in sequence from a block near a beginning of the block sequence.

A twenty-second aspect of the present invention is directed to a program supply method for supplying over a network a computer-executable program for recording input video and/or audio data, the program achieving on the computer an operating environment comprising the following steps:

a block generating step for generating a plurality of blocks of a uniform size from input video and/or audio data; and a recording step for recording a generated block to a recording medium, which is rewritable, randomly accessible, and accompanied by mechanical operation in recording;

wherein the recording step for recording a generated block to a recording medium:

records a plurality of generated blocks to the recording medium so that blocks are arranged in a linear and consecutive sequence until the recording medium becomes full; and after the recording medium becomes full:
selects a block to be recorded from generated blocks;
selects a block from a block sequence on the recording medium as a block to be overwritten; and
records a block to be recorded by overwriting to a block to be overwritten in sequence from a block near a beginning of the block sequence.

These and other objects, features, aspects, and advantages of the present invention will become more apparent from the following detailed description of the present invention when taken in conjunction the accompanying drawings.

BRIEF DESCRIPTION OF THE DRAWINGS

FIG. 2 is a block diagram of an exemplary hardware embodiment of the video and/or audio recording apparatus shown in FIG. 1;

FIG. 8 is an exemplary overwrite block table corresponding to the block arrangement shown in FIG. 5;

FIG. 9 is an exemplary overwrite block table corresponding to the block arrangement shown in FIG. 6;

FIG. 10 is an exemplary overwrite block table corresponding to the block arrangement shown in FIG. 7;

FIG. 21 is an exemplary overwrite block table corresponding to the block arrangement shown in FIG. 18;

FIG. 22 is an exemplary overwrite block table corresponding to the block arrangement shown in FIG. 19;

FIG. 23 is an exemplary overwrite block table corresponding to the block arrangement shown in FIG. 20.

DESCRIPTION OF THE PREFERRED EMBODIMENTS

The preferred embodiments of the present invention are described below with reference to the accompanying figures.

(First Embodiment)

Figure 1:
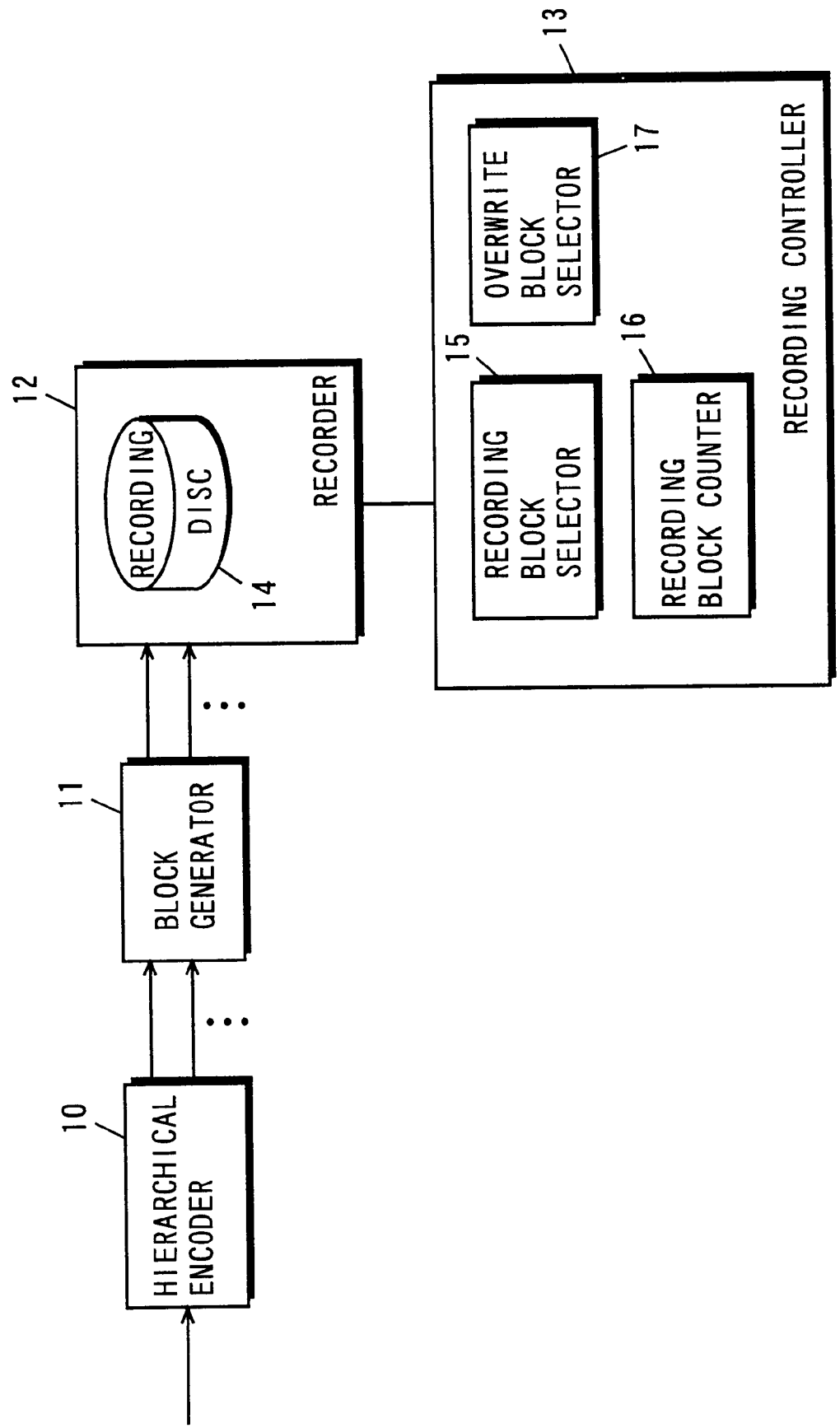
FIG. 1 is a function block diagram of a video and/or audio recording apparatus according to a first embodiment of the present invention.

FIG. 1 is a function block diagram of a video and/or audio recording apparatus according to a first embodiment of the present invention. As shown in FIG. 1, a video and/or audio recording apparatus according to this first preferred embodiment of the present invention (referred to below as simply a video and/or audio recording apparatus) comprises a hierarchical encoder 10, block generator 11, recorder 12, and recording controller 13.

The recorder 12 has a recording disc 14.

The recording controller 13 has a recording block selector 15, a recording block counter 16, and an overwrite block selector 17.

The hierarchical encoder 10 hierarchically codes input video and/or audio data. The input video and/or audio data is compressed or uncompressed digital video and/or audio data.

The block generator 11 generates blocks of a uniform size from the data belonging to each hierarchical layer resulting from the hierarchical coding operation of the hierarchical encoder 10.

The recorder 12 then records the data blocks generated by the block generator 11 to the recording disc 14. The recording disc 14 is a rewritable, randomly accessible, disk type recording medium such as: a magnetic disk such as a floppy disk or hard disk; a Mini Disk (MD) or other magneto-optical (MO) disk; a CD-R, DVD-RAM, or other phase-change optical disk.

It should be noted that any other type of rewritable, randomly accessible recording medium which is accompanied by mechanical operation at the time of recording can be used for the recording disc 14.

The recording controller 13 controls the recorder 12.

That is, the recording block selector 15 of the recording controller 13 selects the data blocks generated by the block generator 11 to be recorded to the recording disc 14. These blocks are referred to below as the "recording blocks." The recording block counter 16 counts the number of blocks recorded to the recording disc 14 by the recorder 12. The overwrite block selector 17 has an overwrite block table (described further below), and refers to this overwrite block table to select the block or blocks to be overwritten (the overwrite blocks below) in the block sequence recorded to the recording disc 14. The recording controller 13 then controls the recorder 12 to record recording blocks by overwriting the selected overwrite blocks in sequence starting from a block near the beginning of the selected series of overwrite blocks.

FIG. 2 is a block diagram of an exemplary hardware embodiment of the video and/or audio recording apparatus shown in FIG. 1. As shown in FIG. 2, this video and/or audio recording apparatus comprises a CPU 20, program memory 21, and a disk drive 22.

The disk drive 22 has a recording head (not shown in the figures). appropriate to the recording disc 14, and a mechanism (also not shown in the figures) for driving the recording disc 14 and recording head.

The program memory 21 stores program data embodying a video and/or audio recording method according to the present invention. A video and/or audio recording method according to the present invention is achieved by the CPU 20 operating according to this stored program data.

Program data can be stored to the program memory 21 by the following three methods. A first method is to read the program data from a recording medium to which it is recorded, and store the read program data to the program memory 21. A second method is to receive program data transmitted over a network, and then store the received program data to the program memory 21. A third method is to store the program data to the program memory 21 prior to shipping the video and/or audio recording apparatus from the factory.

A video and/or audio recording apparatus thus comprised hierarchically codes video and/or audio data input thereto, and generates blocks of a uniform size from the data belonging to each layer resulting from the hierarchical coding operation. The generated blocks are then linearly and contiguously recorded to the recording disc 14 in a first recording stage until the recording disc 14 is full. Once the recording disc 14 is full, the specific blocks to be recorded (that is, recording blocks) in a particular γth recording stage (where γ=2, 3, . . . α, and α is a desirable constant integer value of 2 or more) are selected, and the particular blocks to be overwritten (that is, the overwrite blocks) by the selected recording blocks are selected from the block sequence recorded to the recording disc 14. The selected recording blocks are then recorded by overwriting the selected overwrite blocks starting from an overwrite block near the beginning of the selected overwrite block sequence.

Figure 3:
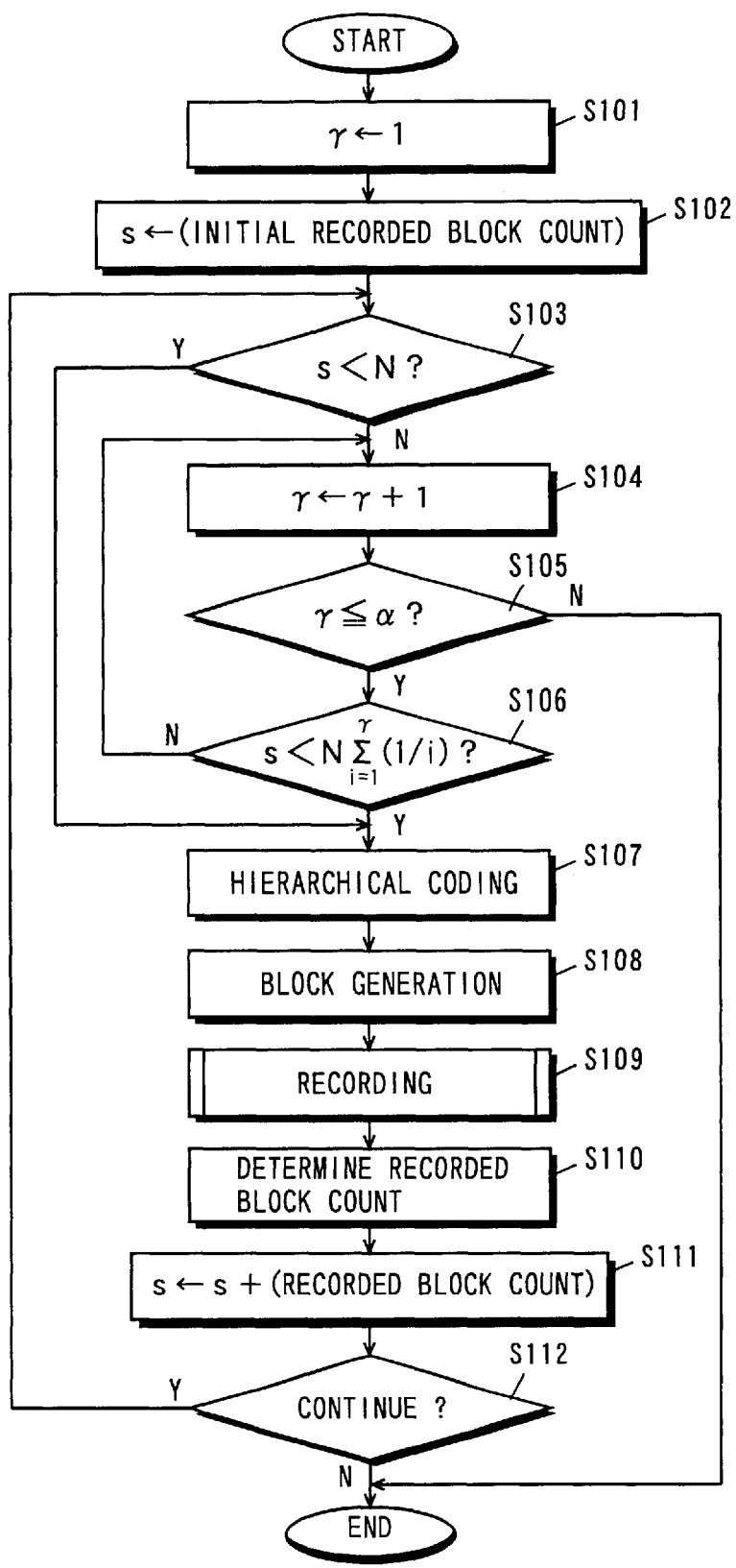
FIG. 3 is a flow chart used to describe the operation of the video and/or audio recording apparatus shown in FIG. 1.

FIG. 3 is a flow chart used to describe the operation of the above-described video and/or audio recording apparatus. The operation of this video and/or audio recording apparatus is described next below with reference to the flow chart in FIG. 3.

The recording controller 13 holds α threshold values where the value of α is predetermined based on the capacity of the recording disc 14. The number α of these threshold values is {N, N+N/2, N+N/2+N/3, . . . , N+N/2+N/3+ . . . +N/α}, for example, where N is the total number of blocks that can be recorded to the recording disc 14 without overwriting, and N is a multiple of β (where β is described further below).

The recording controller 13 also stores the number of blocks recorded to the recording disc 14 by a previous operation (referred to below as the "initial recorded block count").

Referring to FIG. 3, the recording controller 13 first sets as a variable γ←1 (step S101), and a variable s←the initial recorded block count (step S102). It then determines if s<N (step S103). If the result is yes, the recording controller 13 skips to step S107.

If the result of S103 is no, the recording controller 13 increments γ (that is, γ←γ+1) (step S104), and then determines if γ≦α (step S105). If the result is no, the operation stops.

However, if step S105 returns yes, the recording controller 13 determines if s is less than the sum (N+N/2+N/3+ . . . +N/α) (step S106). If the result is yes, the recording controller 13 advances to step S107.

If S106 returns no, the recording controller 13 loops back to step S104 and repeats the same steps.

The hierarchical encoder 10 then begins a process for hierarchically coding the input video and/or audio data (step S107). It should be noted that this hierarchical coding process is described further below.

Next, the block generator 11 generates blocks of a uniform size from the data belonging to each hierarchical layer resulting from the hierarchical coding operation of the hierarchical encoder 10 (step S108).

The recording controller 13 then instructs the recorder 12 to begin a process for recording the blocks generated by the block generator 11 to the recording disc 14 (step S109).

Figure 4:
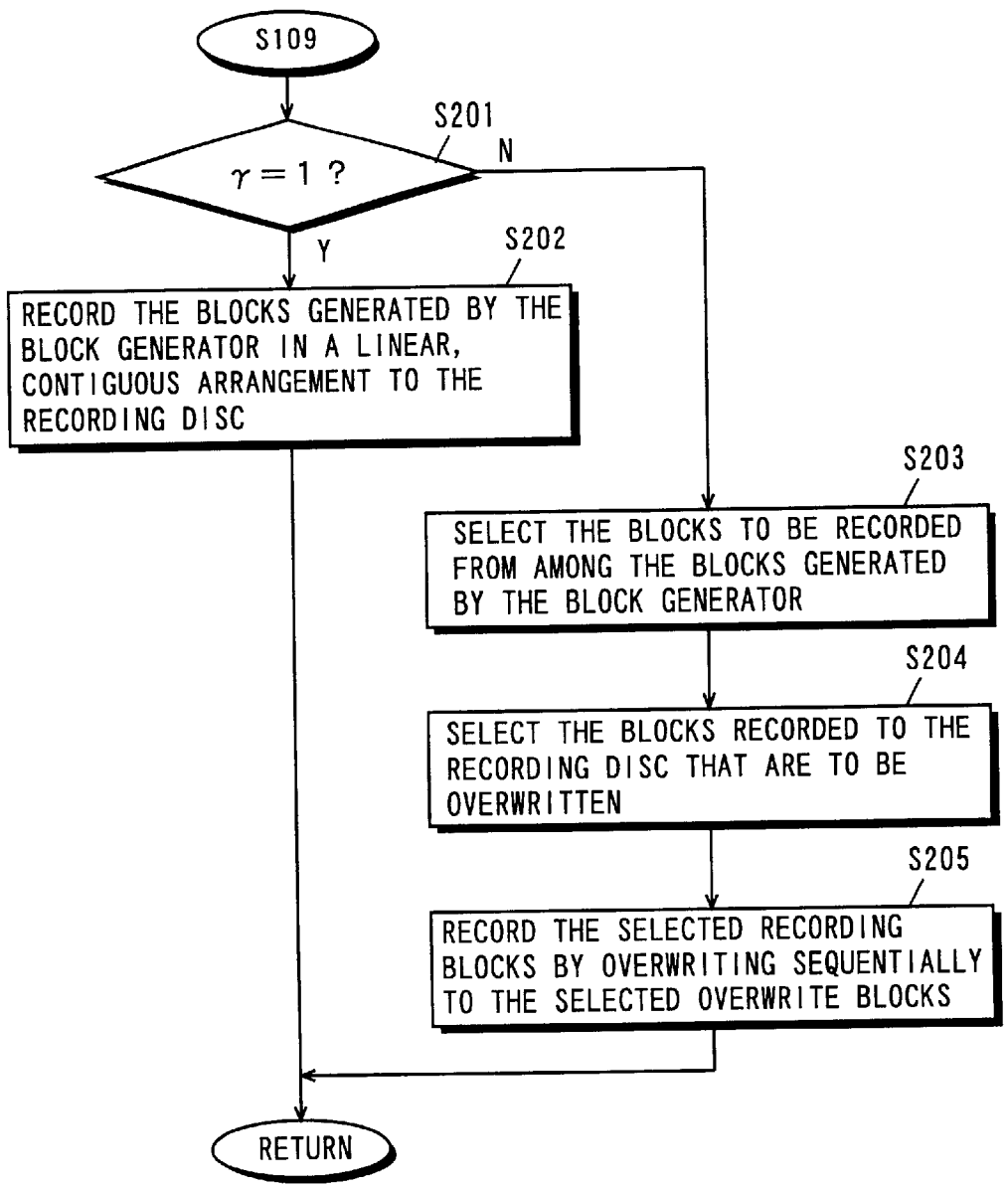
FIG. 4 is a flow chart showing details of the recording process shown as step S109 in FIG. 3.

FIG. 4 is a flow chart showing details of the recording process shown as step S109 in FIG. 3. The recording process shown as step S109 in FIG. 3 is described next below with reference to FIG. 4.

Referring to FIG. 4, the recording controller 13 first determines whether variable γ=1 (step S201). If yes, that is, γ=1, the recording controller 13 controls the recorder 12 to record the blocks generated by the block generator 11 in a linear and contiguous arrangement to the recording disc 14 (step S202). The sequence in which the blocks generated by the block generator 11 are recorded in layers is described further below.

If the result of step S201 is no (that is, γ=2, 3, . . . α), the recording block selector 15 selects the specific blocks to be recorded from among the blocks generated by the block generator 11 (step S203). The selection of the blocks in the step is also described further below.

Next, the overwrite block selector 17 refers to the overwrite block table to select the specific blocks recorded to the recording disc 14 that are to be overwritten by the recording blocks selected in step S203 (step S204). Note that the overwrite block table referenced in this step, and the selection of the blocks for overwriting, are also described further below.

The recording controller 13 then controls the recorder 12 to record the recording blocks selected by the recording block selector 15 by overwriting those blocks to the overwrite blocks selected by the overwrite block selector 17 in sequence from a block near the beginning of the sequence of blocks (step S205). Note that the sequence in which the blocks generated by the block generator 11 are recorded in layers is described further below.

This completes the recording process shown as step S109 in FIG. 3.

Referring again to FIG. 3, the recording block counter 16 then counts the number of blocks recorded to the recording disc 14 by the recorder 12 in step S109, and thus obtains a recorded block count (step S110). Variable s is then set as s←(s+recorded block count) (step S111).

It should be noted that the value of s obtained in step S111 is indicative of the total number of blocks recorded by the recorder 12 to the recording disc 14 up to that point in time, including the number of blocks that were recorded but then lost by overwriting.

Next, the recording controller 13 determines whether video and/or audio data is still being input to the hierarchical encoder 10 (step S112). If the result is no, the operation ends.

If the result of S112 is yes, the recording controller 13 returns to step S103. Variable γ is then incremented as the loop repeats. The process ends when step S105 returns no, that is, when γ>α.

The hierarchical coding process shown as step S107 in FIG. 3 is described next below.

The hierarchical coding performed by the hierarchical encoder 10 in step S107 is the hierarchical coding of β layers (where β is the least common multiple of {α, α−1, α−2, ... 3, 2}). That is, the hierarchical encoder 10 hierarchically codes the input video and/or audio data in β layers (layer 1 to layer β) so that the data in layer 1 (the least significant layer) can be independently decoded in layer 1, and data in layer 2 to layer β is decoded with reference to the layer that is one layer lower.

It should be noted that any hierarchical coding method can be used insofar as the layers (layer 1 to layer β) obtained by hierarchical coding satisfy this relationship.

For example, even the hierarchical coding method noted above in the description of background art can be used. That is, the input video and/or audio data is orthogonal transform coded or subband coded, then divided into β frequency bands, and hierarchized such that the low frequency band is the least significant layer, and the high frequency band is the most significant layer.

Alternatively, a pyramid coding method can be used in place of a method combining (non-hierarchical) coding and hierarchizing as noted above. That is, the input data is sequentially filtered and sampled to build a pyramidical hierarchy of layers 1 to layer β each having a different spatial resolution.

It should be noted that the MPEG-2 standard requires spatial, temporal, and SNR (signal-to-noise ratio; quality) scalabilities. It will therefore be obvious that a hierarchy satisfying the above-described hierarchical arrangement can be obtained by coding according to the MPEG-2 standard. It should be further noted that scalability refers to an ability to extract and decode one part of the coded data, and scalability, that is, the ability to change spatial resolution, temporal resolution, or SNR, can be achieved by hierarchical coding.

The blocks which are selected as the recording blocks and the overwrite blocks, and what sequence the selected blocks are recorded to the hierarchy (layers), in the recording process shown as step S109 in FIG. 3 are described next with reference to FIG. 5 to FIG. 7.

Figure 5:
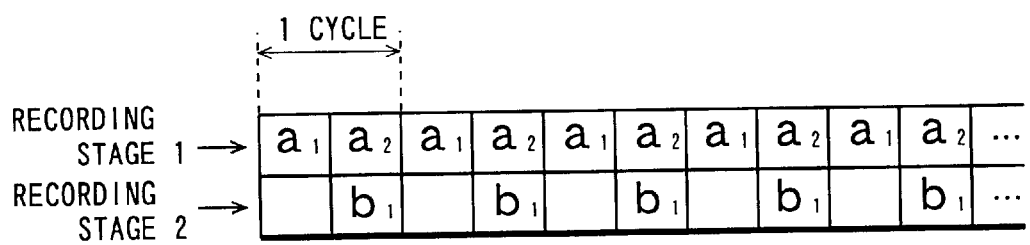
FIG. 5 is a typical diagram showing an exemplary arrangement of data blocks on a recording disc 14 obtained as a result of the recording process shown as step S109 in FIG. 3.
Figure 6:
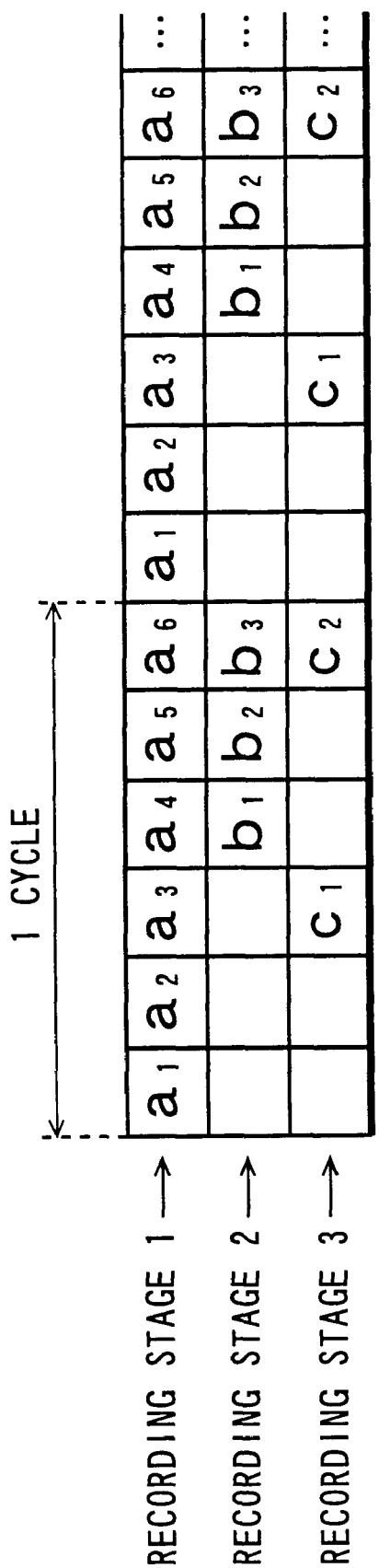
FIG. 6 is a typical diagram showing an alternative exemplary arrangement of data blocks on a recording disc 14 obtained as a result of the recording process shown as step S109 in FIG. 3.
Figure 7:
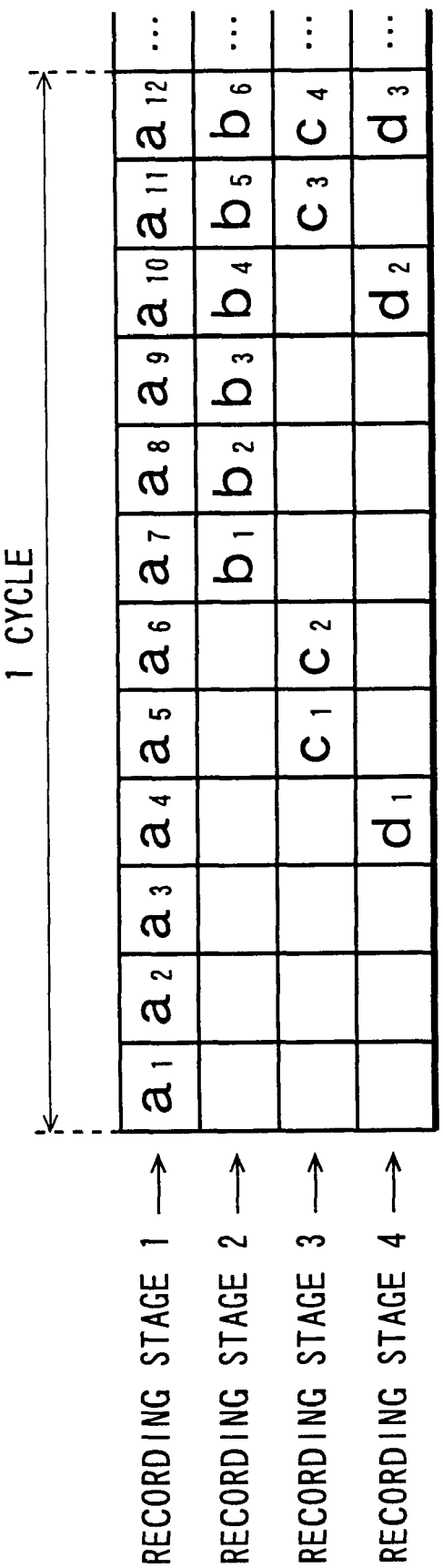
FIG. 7 is a typical diagram showing a further alternative exemplary arrangement of data blocks on a recording disc 14 obtained as a result of the recording process shown as step S109 in FIG. 3.

FIG. 5 to FIG. 7 are tables showing some typical arrangements obtained by the recording process shown as step S109 in FIG. 3. Note that the arrangement shown in FIG. 5 is obtained when α=2, the arrangement shown in FIG. 6 is obtained when α=3, and the arrangement shown in FIG. 7 is obtained when α=4.

Furthermore, note that in FIG. 5 to FIG. 7 "a" indicates a block recorded in recording stage 1, "b" indicates a block recorded in recording stage 2, "c" indicates a block recorded in recording stage 3, and "d" indicates a block recorded in recording stage 4. The numbers suffixed to these block symbols indicate a layer. The layers are labeled 1, 2, 3, and so forth in sequence from the bottom layer. Therefore, for example, a2 indicates a layer 2 block recorded in recording stage 1, and b1 indicates a layer 1 (bottom layer) block recorded in recording stage 2.

In the first case described below, α=2 (in which case β=2).

In recording stage 1 (γ=1), the recording controller 13 controls the recorder 12 to record blocks generated by the block generator 11 in the sequence: layer 1 block, layer 2 block, layer 1 block, layer 2 block, and so forth. That is, blocks are recorded in a cyclical sequence of two blocks per cycle with one layer 1 block and one layer 2 block in each cycle.

In recording stage 2 (γ=2), the recording block selector 15 selects layer 1 blocks from the blocks generated by the block generator 11, and the overwrite block selector 17 selects the layer 2 blocks in the block sequence recorded to the recording disc 14. The recording controller 13 then controls the recorder 12 to record the layer 1 blocks selected by the recording block selector 15 by overwriting them to the layer 2 blocks selected by the overwrite block selector 17 in sequence starting from the layer 2 block near the beginning of the recorded block sequence.

As a result of this recording method, as shown in FIG. 5, a series of blocks in the sequence a1, a2, a1, a2, and so forth exists on the recording disc 14 when recording stage 1 is completed. When recording stage 2 is then completed, the a2 blocks in the [a1, a2, a1, a2, ... ] series have been replaced by b1 blocks, and the resulting block sequence on the recording disc 14 is a1, b1, a1, b1, and so forth.

When recording stage 2 is thus completed, the block sequence on the recording disc 14 evenly contains blocks recorded in recording stages 1 and 2.

In the next case described below, α=3 (in which case β=6).

In recording stage 1 (γ=1), the recording controller 13 controls the recorder 12 to record blocks generated by the block generator 11 in a cyclical sequence. In this case, however, each cycle contains a block from each layer 1 to 6, and thus contains six blocks in sequence.

In recording stage 2 (γ=2), the recording block selector 15 selects blocks in layers 1 to 3 from the blocks generated by the block generator 11, and the overwrite block selector 17 selects the blocks in layers 4 to 6 in the block sequence recorded to the recording disc 14. The recording controller 13 then controls the recorder 12 to record the layer 1 to layer 3 blocks selected by the recording block selector 15 as one cycle of three sequential blocks by overwriting them to the layer 4 to 6 blocks selected by the overwrite block selector 17 in sequence starting from the layer 4 to 6 block cycle near the beginning of the recorded block sequence.

In recording stage 3 (γ=3), the recording block selector 15 selects blocks in layers 1 and 2 from the blocks generated by the block generator 11, and the overwrite block selector 17 selects the layer 3 blocks in the block sequence recorded to the recording disc 14. The recording controller 13 then controls the recorder 12 to record the layer 1 and layer 2 blocks selected by the recording block selector 15 as one cycle of two sequential blocks by overwriting them to the layer 3 blocks selected by the overwrite block selector 17 in sequence starting from the layer 3 block near the beginning of the recorded block sequence.

As a result of this recording method, as shown in FIG. 6, a series of blocks in the sequence [a1, a2, ... a6, a1, a2, ... a6, ... ] and so forth exists on the recording disc 14 when recording stage 1 is completed. When recording stage 2 is then completed, blocks a4 to a6 in the [a1, a2, . . . a6, a1, a2, . . . a6, . . . ] series have been replaced by blocks b1 to b3, and the resulting block sequence on the recording disc 14 is [a1, a2, a3, b1, b2, b3, a1, a2, a3, b1, b2, b3, . . . ] and so forth. When recording stage 3 is completed, blocks a3 and b3 in the [a1, a2, a3, b1, b2, b3, . . . ] series have been replaced by blocks c1 and c2, and the resulting block sequence on the recording disc 14 is [a1, a2, c1, b1, b2, c2, a1, a2, c1, b1, b2, c2, . . . ] and so forth.

When recording stage 2 is thus completed, the block sequence recorded to the recording disc 14 evenly contains blocks recorded in recording stages 1 and 2. In addition, when recording stage 3 is completed, the block sequence recorded to the recording disc 14 evenly contains blocks recorded in recording stages 1, 2, and 3.

In the next case described below, $\alpha=4$ (in which case $\beta=12$).

In recording stage 1 ($\gamma=1$), the recording controller 13 controls the recorder 12 to record blocks generated by the block generator 11 in a cyclical sequence. In this case, however, each cycle contains a block from each layer 1 to 12, and thus contains twelve blocks in sequence.

In recording stage 2 ($\gamma=2$), the recording block selector 15 selects blocks in layers 1 to 6 from the blocks generated by the block generator 11, and the overwrite block selector 17 selects the blocks in layers 7 to 12 in the block sequence recorded to the recording disc 14. The recording controller 13 then controls the recorder 12 to record the layer 1 to layer 6 blocks selected by the recording block selector 15 as one cycle of six sequential blocks by overwriting them to the layer 7 to 12 blocks selected by the overwrite block selector 17 in sequence starting from the layer 7 to 12 block cycle near the beginning of the recorded block sequence.

In recording stage 3 ($\gamma=3$), the recording block selector 15 selects blocks in layers 1 to 4 from the blocks generated by the block generator 11, and the overwrite block selector 17 selects the layer 5 and layer 6 blocks in the block sequence recorded to the recording disc 14. The recording controller 13 then controls the recorder 12 to record the layer 1 to layer 4 blocks selected by the recording block selector 15 as one cycle of four sequential blocks by overwriting them to the layer 5 and layer 6 blocks selected by the overwrite block selector 17 in sequence starting from the layer 5 and layer 6 blocks near the beginning of the recorded block sequence.

In recording stage 4 ($\gamma=4$), the recording block selector 15 selects blocks in layers 1 to 3 from the blocks generated by the block generator 11, and the overwrite block selector 17 selects the layer 4 blocks in the block sequence recorded to the recording disc 14. The recording controller 13 then controls the recorder 12 to record the layer 1 to layer 3 blocks selected by the recording block selector 15 as one cycle of three sequential blocks by overwriting them to the layer 4 blocks selected by the overwrite block selector 17 in sequence starting from the layer 4 blocks near the beginning of the recorded block sequence.

As a result of this recording method, as shown in FIG. 7, a series of blocks in the sequence [a1, a2, . . . a12, a1, a2, . . . a12, . . . ] and so forth exists on the recording disc 14 when recording stage 1 is completed. When recording stage 2 is then completed, blocks a7 to a12 in the [a1, a2, . . . a12, a1, a2, . . . a12, . . . ] series have been replaced by blocks b1 to b6, and the resulting block sequence on the recording disc 14 is [a1, . . . a6, b1, . . . b6, a1, . . . a6, b1, . . . b6, . . . ] and so forth. When recording stage 3 is then completed, blocks a5, a6, b5, and b6 in the [a1, . . . a6, b1, . . . b6, a1, . . . a6, b1, . . . b6, . . . ] series have been replaced by blocks c1 to c4, and the resulting block sequence on the recording disc 14 is [a1 . . . a4, c1, c2, b1 . . . b4, c3, c4, a1 . . . a4, c1, c2, b1 . . . b4, c3, c4 . . . ] and so forth. When recording stage 4 is then completed, blocks a4, b4, and c4 in the [a1 . . . a4, c1, c2, b1 . . . b4, c3, c4, . . . ] series have been replaced by blocks d1 to d3, and the resulting block sequence on the recording disc 14 is [a1 . . . a3, d1, c1, c2, b1 . . . b3, d2, c3, d3, a1 . . . a3, d1, c1, c2, b1 . . . b3, d2, c3, d3 . . . ] and so forth.

When recording stage 2 is thus completed, the block sequence recorded to the recording disc 14 evenly contains blocks recorded in recording stages 1 and 2. In addition, when recording stage 3 is completed, the block sequence recorded to the recording disc 14 evenly contains blocks recorded in recording stages 1, 2, and 3. Furthermore, when recording stage 4 is completed, the block sequence recorded to the recording disc 14 evenly contains blocks recorded in recording stages 1, 2, 3, and 4.

As will be known from the examples described above, the number of layers $\beta$ is generally the least common multiple of $\{\alpha, \alpha-1, \alpha-2, \ldots 2\}$.

In recording stage 1 ($\gamma=1$), the recording controller 13 thus controls the recorder 12 to record blocks generated by the block generator 11 in a cyclical sequence such that one cycle contains a block from each layer 1 to layer $\beta$. One cycle thus contains $\beta$ blocks, and the resulting recording block sequence is: layer 1 block, layer 2 block, . . . layer $\beta$ block, layer 1 block, layer 2 block, . . . layer $\beta$ block, and so forth.

In recording stage $\gamma$ (where $\gamma=2, 3, \ldots \alpha$), the recording block selector 15 selects blocks in layer 1 to layer ($\beta/\gamma$) from the blocks generated by the block generator 11, and the overwrite block selector 17 selects blocks in layer ($\beta/\gamma+1$) to layer ($\beta/(\gamma-1)$) in the block sequence recorded to the recording disc 14. The recording controller 13 then controls the recorder 12 to record the layer 1 to layer ($\beta/\gamma$) blocks selected by the recording block selector 15 as one cycle of ($\beta/\gamma$) sequential blocks by overwriting them to the layer ($\beta/\gamma+1$) to layer ($\beta/(\gamma-1)$) blocks selected by the overwrite block selector 17 in sequence starting from the selected block cycle near the beginning of the recorded block sequence.

When recording stage $\gamma$ (where $\gamma=2, 3, \ldots \alpha$) is thus completed as a result of this recording method, the block sequence recorded to the recording disc 14 evenly contains blocks recorded in recording stages 1 to $\gamma$.

The overwrite block tables referenced by the overwrite block selector for the block selection performed as step S204 in FIG. 4 is described next below.

FIG. 8 is an exemplary overwrite block table corresponding to the block arrangement shown in FIG. 5. FIG. 8 shows that when one cycle consists of two consecutive blocks, the overwrite block in recording stage 2 ($\gamma=2$) is the second block from the beginning of one cycle in the block sequence recorded to the recording disc 14 when recording stage 1 is completed.

FIG. 9 is an exemplary overwrite block table corresponding to the block arrangement shown in FIG. 6. FIG. 9 shows that when one cycle consists of six consecutive blocks, the overwrite blocks in recording stage 2 ($\gamma=2$) are the three blocks, that is, blocks 4 to 6, from the beginning of one cycle in the block sequence recorded to the recording disc 14 when recording stage 1 is completed. In recording stage 3 ($\gamma=3$) there are two overwrite blocks, that is, blocks 3 and 6 from the beginning of one cycle of six consecutive blocks in the block sequence recorded to the recording disc 14 when recording stage 2 is completed.

FIG. 10 is an exemplary overwrite block table corresponding to the block arrangement shown in FIG. 7. FIG. 10 shows that when one cycle consists of twelve consecutive blocks, the overwrite blocks in recording stage 2 ($\gamma=2$) are the six blocks, that is, blocks 7 to 12, from the beginning of one cycle in the block sequence recorded to the recording disc 14 when recording stage 1 is completed. In recording stage 3 ($\gamma=3$) there are four overwrite blocks, that is, blocks 5, 6, 11 and 12 from the beginning of one cycle of twelve consecutive blocks in the block sequence recorded to the recording disc 14 when recording stage 2 is completed. Furthermore, in recording stage 4 ($\gamma=4$) there are three overwrite blocks, that is, blocks 4, 10 and 12 from the beginning of one cycle of twelve consecutive blocks in the block sequence recorded to the recording disc 14 when recording stage 3 is completed.

Further description of overwrite block tables when $\alpha\gamma 5$ is omitted below.

Thus, by recording blocks in a predefined hierarchical sequence so that blocks at particular positions in the block sequence recorded to the recording disc 14 can be selected as the overwrite blocks to be overwritten, the overwrite blocks can be easily selected by referring to a stored predefined overwrite block table. As noted above, this overwrite block table indicates the position of the overwrite blocks in the block sequence by, for example, listing the ordinal number of the overwrite blocks from the beginning of the recorded block sequence.

Furthermore, by recording the blocks in sequence from a lower layer as described above, for example, so that there is a periodicity to the location of the selected blocks, small overwrite block tables indicating block locations in a single cycle are sufficient.

It should be noted that while recording blocks are recorded in sequence from a lower layer in all recording stages in the above description of this preferred embodiment, the order in which the recording blocks are recorded can be determined as desired for each recording stage. However, when the recording blocks are recorded in any order other than sequentially from a lower layer, the read sequence and decoding sequence will not match when the blocks are subsequently read from the recording disc 14 and decoded. As a result, the buffer capacity required to temporarily store the read blocks during reproduction will be greater than when the blocks are recorded in sequence from a lower layer.

As described above, this preferred embodiment of the present invention hierarchically codes input video and/or audio data, and generates blocks of a uniform size from the data belonging to each layer. The generated blocks are then recorded in a linear, consecutive sequence to a recording disc 14 until the recording disc 14 is filled to capacity. After the recording disc 14 is filled, blocks from a lower layer are selected from the generated blocks as the blocks to be recorded (that is, the recording blocks), and higher layer blocks are selected from the block sequence recorded to the recording disc 14 as the blocks to be overwritten (that is, the overwrite blocks) with the selected recording blocks. The selected recording blocks (lower layer blocks) are then recorded by overwriting them to the selected overwrite blocks (higher layer blocks) in sequence from an overwrite block near the beginning of the recorded block sequence.

It is therefore possible to achieve hierarchical overwrite recording without an accompanying complicated mechanical operation even after the recording disc 14 becomes full.

Recording can therefore continue even if the recording disc 14 becomes full during the recording process, and interruptions in the reproduced video and/or audio are eliminated. Furthermore, if the recording disc 14 is not filled, high quality video and/or audio reproduction can be achieved.

More specifically, input video and/or audio data is hierarchically coded to $\beta$ layers, that is, layer 1 to layer $\beta$, and the data in each layer is used to generate blocks of a uniform size. The blocks are then recorded to a first recording stage (recording stage 1) until the recording disc 14 is full, and are thereafter recorded to a $\gamma$th recording stage (recording stage $\gamma$ where $\gamma=2, 3, \ldots \alpha$), In recording stage 1, the blocks generated for layer 1 to layer $\beta$ are recorded in a linear consecutive sequence on the recording disc 14 in a $\beta$ block cycle containing a block from layer 1 to layer $\beta$. Next, in recording stage $\gamma$, blocks in layer 1 to layer ($\beta/\gamma$) are selected from the generated blocks as the blocks to be recorded (the recording blocks), and blocks in layer ($\beta/\gamma+1$) to layer ($\beta/(\gamma-1)$) are selected in the block sequence recorded to the recording disc 14 as the blocks to be overwritten (the overwrite blocks). The selected layer 1 to layer ($\beta/\gamma$) blocks (recording blocks) are then recorded in a cyclical sequence of ($\beta/\gamma$) blocks by overwriting them to the blocks in layer ($\beta/\gamma+1$) to layer ($\beta/(\gamma-1)$) selected as overwrite blocks.

When recording stage $\gamma$ is thus completed using this recording method, the block sequence recorded to the recording disc 14 evenly contains blocks recorded in recording stages 1 to $\gamma$.

It is therefore possible to record video and/or audio data such that the quality of the reproduced video and/or audio is the same in every recording stage even if the quality of the reproduced video and/or audio gradually deteriorates as hierarchical overwrite recording thus progresses from recording stage 1 to recording stage 2 and recording stage $\alpha$, and irrespective of the recording stage at which hierarchical overwrite recording ends in the range recording stage 2 to recording stage $\alpha$. In other words, if hierarchical overwrite recording ends at recording stage $\gamma$, the quality of the video and/or audio reproduced for recording stage 1 to recording stage $\gamma$ will be same for every stage.

While the video and/or audio data is recorded in the present embodiment, in addition to the above, a description language for animation such as the "Director" of Macromedia Corporation, for example, can be recorded (the same is true in the following embodiments).

Moreover, while the recording disc is used as a recording medium in the present embodiment, a magnetic tape may be also used. In this case, the data is recorded in sequence from the head of the tape in recording stage 1, then in the reverse sequence from the end of the tape in recording stage 2, and in the sequence from the head of the tape again in recording stage 3. The data is similarly recorded thereafter in the alternating sequence, which saves the time required for rewinding the tape. Besides, in the case where a multi-track tape is used, it is possible to effectively perform the recording process in recording stage 2 and thereafter by relating the layers to tracks in recording stage 1 (the same is true in the following embodiments).

Furthermore, in the present embodiment, the hierarchical encoder 10 hierarchically codes input video and/or audio data so that data in the bottom layer is decoded within the layer and data in a layer other than the bottom layer is decoded by referring to a one lower layer. It should be noted, however, the hierarchical encoder 10 can also hierarchically code input video and/or audio data so that data in a layer other than the bottom layer is decoded by referring to two or more layers.

It should be noted that with a video and/or audio recording apparatus according to the first embodiment of the present invention, for example, β=12 when α=4, and β=60 when α=5. With hierarchical coding, the complexity of the algorithm increases as the number of layers, that is, β in this embodiment, increases, and coding efficiency drops. An extremely fast CPU 20 is therefore required if the maximum number of recording stages, that is, α, becomes very large.

The second and third embodiments of the present invention described below therefore disclose a video and/or audio recording apparatus suitable for extended-time recording using limited CPU resources.

(Second Embodiment)

The functional and hardware configuration of a video and/or audio recording apparatus according to the second embodiment of the present invention are identical to those of a video and/or audio recording apparatus according to the first embodiment above. Except for one part, the operation is also the same as that of the first embodiment. Therefore, this second embodiment is described below also with reference to FIGS. 1 to 10 by describing how this second embodiment differs from the first embodiment.

From recording stage 1 to recording stage α, a video and/or audio recording apparatus according to this second preferred embodiment of the present invention (herebelow referred to as "video and/or audio recording apparatus") performs the same recording operation, shown as step S109 in FIG. 3, as does a video and/or audio recording apparatus according to the first embodiment.

However, while the video and/or audio recording apparatus of the first embodiment ends the recording operation upon completion of recording stage α, the video and/or audio recording apparatus continues hierarchical overwrite recording to a highest recording stage β. As the case with the above first embodiment, the quality of the video and/or audio reproduced for recording stages 2 to α is the same as a result of hierarchical overwrite recording, but the quality is not necessarily the same when hierarchical overwrite recording is done in recording stages (α+1) to β.

Referring again to FIG. 3, the video and/or audio recording apparatus does not terminate operation when decision step S105 returns no, that is, when γ>α, and thereafter performs a recording process that differs from that of step S109 as described below.

For example, when α=3 as described in the first embodiment with reference to FIG. 6, in recording stage 4 which is recorded after recording stage 3, the recording block selector 15 selects layer 1 blocks from the blocks generated by the block generator 11, and the overwrite block selector 17 selects the layer 2 blocks recorded in recording stage 1 from the block sequence on the recording disc 14. The recording controller 13 then controls the recorder 12 to record the layer 1 blocks (recording blocks) selected by the recording block selector 15 by overwriting them to the layer 2 blocks (overwrite blocks) recorded in recording stage 1 and selected by the overwrite block selector 17.

In recording stage 5, the recording block selector 15 selects layer 1 blocks from the blocks generated by the block generator 11, and the overwrite block selector 17 selects the layer 2 blocks recorded in recording stage 2 from the block sequence on the recording disc 14. The recording controller 13 then controls the recorder 12 to record the layer 1 blocks (recording blocks) selected by the recording block selector 15 by overwriting them to the layer 2 blocks (overwrite blocks) recorded in recording stage 2 and selected by the overwrite block selector 17.

In recording stage 6, the recording block selector 15 selects layer 1 blocks from the blocks generated by the block generator 11, and the overwrite block selector 17 selects the layer 2 blocks recorded in recording stage 3 from the block sequence on the recording disc 14. The recording controller 13 then controls the recorder 12 to record the layer 1 blocks (recording blocks) selected by the recording block selector 15 by overwriting them to the layer 2 blocks (overwrite blocks) recorded in recording stage 3 and selected by the overwrite block selector 17.

Figure 11:
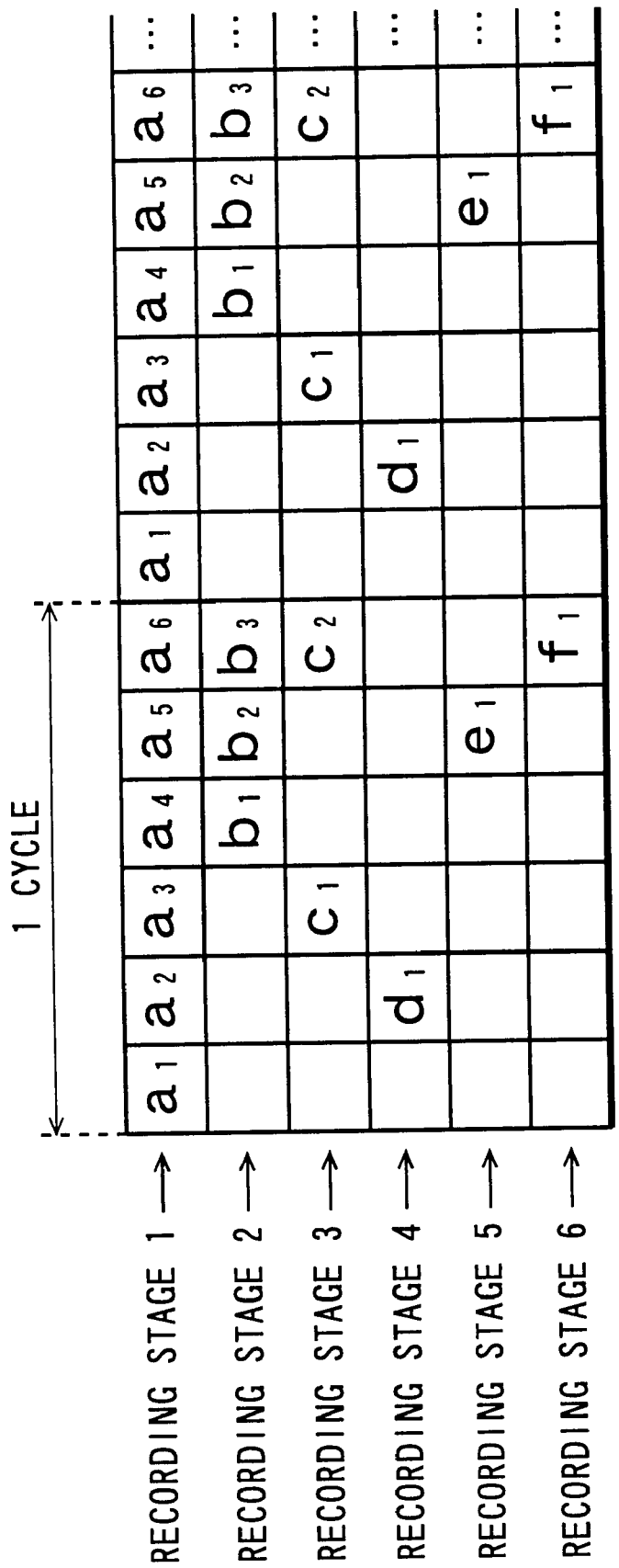
FIG. 11 is a table (in which the block arrangement in stages 1 to 3 is identical to that shown in FIG. 6) used to describe a recording process performed by a video and/or audio recording apparatus according to a second embodiment of the present invention.

When recording stage 4 is thus completed as a result of this recording method, the a2 blocks in the block sequence [a1, a2, c1, b1, b2, c2, a1, a2, c1, b1, b2, c2, . . . ] on the recording disc 14 when recording stage 3 was completed series have been replaced by blocks d1. The block sequence when recording stage 4 is completed is therefore [a1, d1, c1, b1, b2, c2, a1, d1, c1, b1, b2, c2, . . . ] as shown in FIG. 11. When recording stage 5 is then completed, the b2 blocks have been replaced by blocks e1 in the recording stage 4 block sequence [a1, d1, c1, b1, b2, c2, a1, d1, c1, b1, b2, c2, . . . ] on the recording disc 14. The block sequence when recording stage 5 is completed is therefore [a1, d1, c1, b1, e1, c2, a1, d1, c1, b1, e1, c2, . . . ]. When recording stage 6 is then completed, the c2 blocks have been replaced by blocks f1 in the recording stage 5 block sequence [a1, d1, c1, b1, e1, c2, a1, d1, c1, b1, e1, c2, . . . ] on the recording disc 14. The block sequence when recording stage 6 is completed is therefore [a1, d1, c1, b1, e1, f1, a1, d1, c1, b1, e1, f1, . . . ]. It should be noted that the block sequences on the recording disc 14 when recording stages 1 to 3 are completed are as shown in FIG. 6.

When recording stage 2 is thus completed, the block sequence recorded to the recording disc 14 evenly contains blocks recorded in recording stages 1 and 2, and when recording stage 3 is completed, the block sequence on the recording disc 14 evenly contains blocks recorded in recording stages 1, 2, and 3.

However, when recording stage 4 is completed, the block sequence on the recording disc 14 does not contain an equal number of blocks recorded in each of recording stages 1 to 4, and when recording stage 5 is completed, the block sequence on the recording disc 14 does not contain an equal number of blocks recorded in each of recording stages 1 to 5.

When recording stage 6 is completed, however, the block sequence on the recording disc 14 again evenly contains blocks recorded in each of recording stages 1 to 6.

It should be noted that it will be obvious to one of ordinary skill in the art that various recording processes other than that described above can be applied in recording stages (α+1) to β.

As will be known from the above description, this preferred embodiment of the invention can perform hierarchical overwrite recording from recording stage (α+1) to a highest recording stage β. Furthermore, when hierarchical overwrite recording is completed at or before recording stage α, video and/or audio data can be recorded so that the quality of the reproduced video and/or audio is the same at every recording stage irrespective of where in the range recording stage 2 to recording stage α hierarchical overwrite recording ends.

(Third Embodiment)

The functional and hardware configuration of a video and/or audio recording apparatus according to this third preferred embodiment of the present invention are identical to those of a video and/or audio recording apparatus according to the first embodiment above. Except for one part, the operation is also the same as that of the first embodiment. Therefore, this third embodiment is described below with reference to FIGS. 1 to 10 by describing in detail how this third embodiment differs from the first embodiment.

From recording stage 1 to recording stage α, a video and/or audio recording apparatus according to this third preferred embodiment of the present invention (herebelow referred to as "video and/or audio recording apparatus") performs the same recording operation, shown as step S109 in FIG. 3, as does a video and/or audio recording apparatus according to the first embodiment.

However, while the video and/or audio recording apparatus of the first embodiment ends the recording operation upon completion of recording stage α, a video and/or audio recording apparatus according to this preferred embodiment continues hierarchical overwrite recording to a highest recording stage β.

Unlike a video and/or audio recording apparatus according to the second embodiment, however, this preferred video and/or audio recording apparatus can record video and/or audio data so that the quality of the reproduced video and/or audio is the same at all recording stages, even when hierarchical overwrite recording continues into the range recording stage (α+1) to recording stage β. In this case, however, the quality of the video and/or audio reproduced for a particular recording stage will not be uniform throughout that recording stage, that is, there will be a mixture of higher quality and lower quality parts in the video and/or audio reproduced in a given recording stage.

Referring again to FIG. 3, this preferred video and/or audio recording apparatus does not terminate operation when decision diamond S105 returns no, that is, when γ>α, and thereafter performs a recording process that differs from that of step S109 as described below.

Let us assume by way of example only that β=4. As will be known from the description of the first embodiment above, α=2 in this case. That is, when input video and/or audio data is hierarchically encoded to four layers, it is only possible to record the video and/or audio data through recording stage 2 so that the quality of the reproduced video and/or audio is the same for every recording stage.

The recording process that differs from that of step S109 in FIG. 3 and is performed by a video and/or audio recording apparatus according to this third preferred embodiment is described next below with reference to FIG. 12. Note that β=4 in the case shown in FIG. 12.

Figure 12:
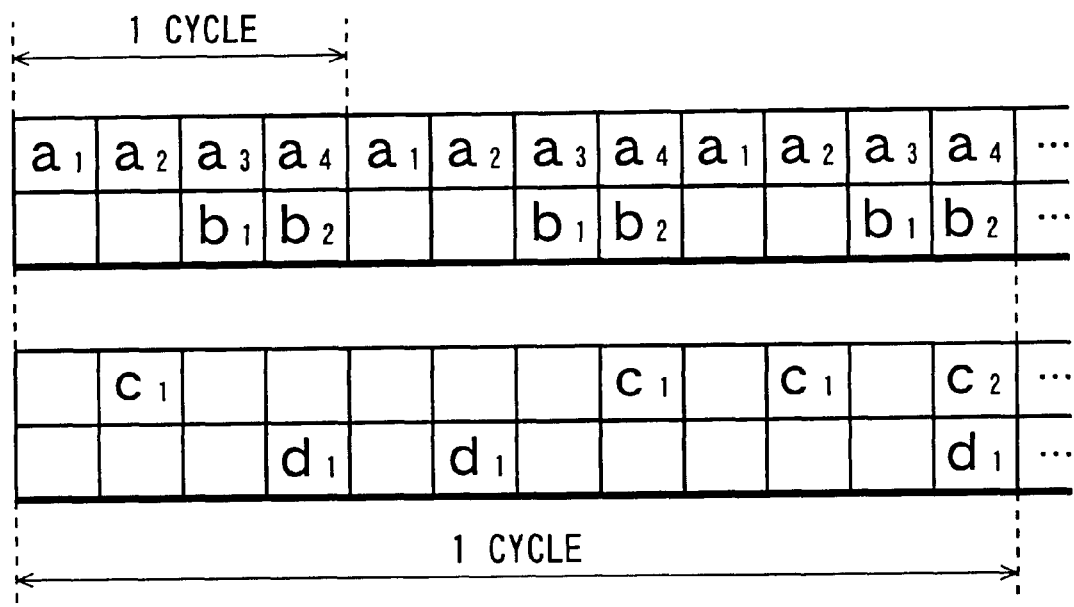
FIG. 12 is a table used to describe a recording process performed by a video and/or audio recording apparatus according to a third embodiment of the present invention wherein the recording process is different from that shown as step S109 in FIG. 3.

As shown in FIG. 12, the block sequence recorded to the recording disc 14 evenly contains blocks recorded in recording stages 1 and 2 when recording stage 2 is completed.

However, while recording stages 1 and 2 are recorded in cycles with a four block period, recording stages 3 and 4 expand the recording cycle to twelve blocks per cycle. As a result, one cycle contains the same number of blocks from each recording stage.

More specifically, the block sequence obtained at the end of recording stage 3 contains four a, b, and c blocks in one cycle, and the video and/or audio quality is the same in recording stages 1 to 3. Of the four "a" blocks, however, three are a1 blocks and one is an a2 block. As a result, the video and/or audio reproduced in recording stage 1 contains both higher quality parts and lower quality parts. The same is true in the video and/or audio reproduced for recording stages 2 and 3.

The block sequence obtained when recording stage 4 is completed, however, contains three a1, b1, c1, and d1 parts each in one cycle. The quality of the video and/or audio is therefore the same in each of recording stages 1 to 4.

As will be known from the above description, this preferred embodiment of the invention can perform hierarchical overwrite recording from recording stage (α+1) to a highest recording stage β. Furthermore, video and/or audio data can be recorded so that the quality of the reproduced video and/or audio is the same at every recording stage irrespective of where in the range recording stage 2 to recording stage β hierarchical overwrite recording ends. However, when recording ends at recording stage (α+1) or higher, there will be higher quality and lower quality parts in the reproduced video and/or audio for any single recording stage.

It should be noted that the first to third embodiments above have been described as hierarchically coding and recording digital video and/or audio data, but the invention shall not be limited thereto. For example, digital video and/or audio data can be encoded by virtual hierarchical coding (that is, simply hierarchized, and not coded such that layer 1 data is independently decoded and layer 2 to layer β data is decoded with reference to the one lower layer) and recorded to a recording disc. Unlike hierarchical coding and recording as described above, this virtual hierarchical coding enables a higher layer to be reproduced even if a lower layer is overwritten and lost, and thus enables a wider variety of recording processes.

Fourth to sixth embodiments of the present invention therefore teach a video and/or audio recording apparatus for recording virtual hierarchical coded digital video and/or audio data to a recording disc.

(Fourth Embodiment)

Figure 13:
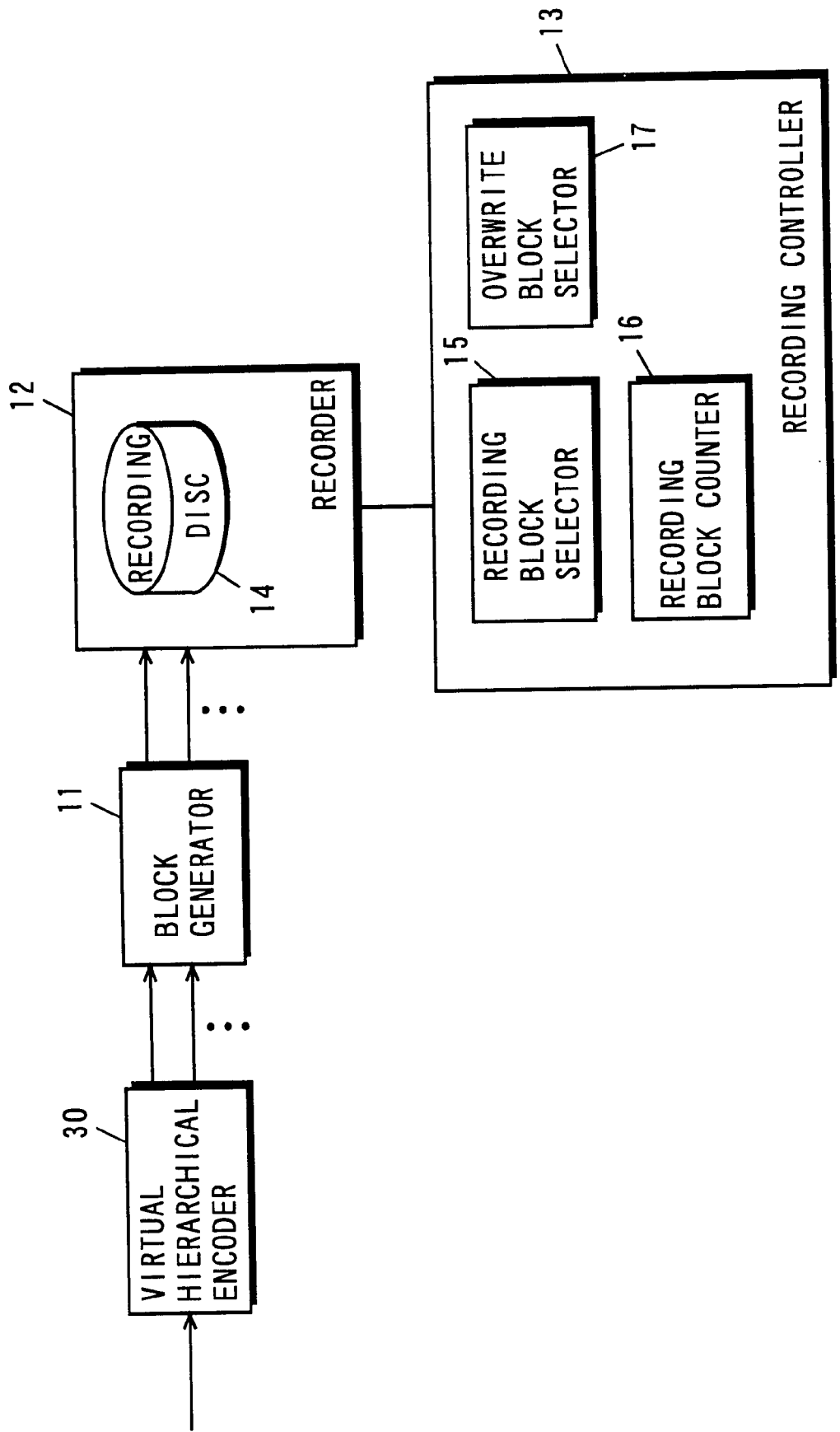
FIG. 13 is a function block diagram of a video and/or audio recording apparatus according to a fourth embodiment of the present invention.

FIG. 13 is a function block diagram of a video and/or audio recording apparatus according to a fourth embodiment of the present invention. As shown in FIG. 13, a video and/or audio recording apparatus according to this preferred fourth embodiment of the invention is a video and/or audio recording apparatus according to the first embodiment of the invention as shown in FIG. 1 in which the hierarchical encoder 10 of the first embodiment is replaced by a virtual hierarchical encoder 30.

Digital video and/or audio data is input to this preferred video and/or audio recording apparatus. Note that the hardware configuration of this video and/or audio recording apparatus is the same as that of the first embodiment shown in FIG. 2.

Figure 14:
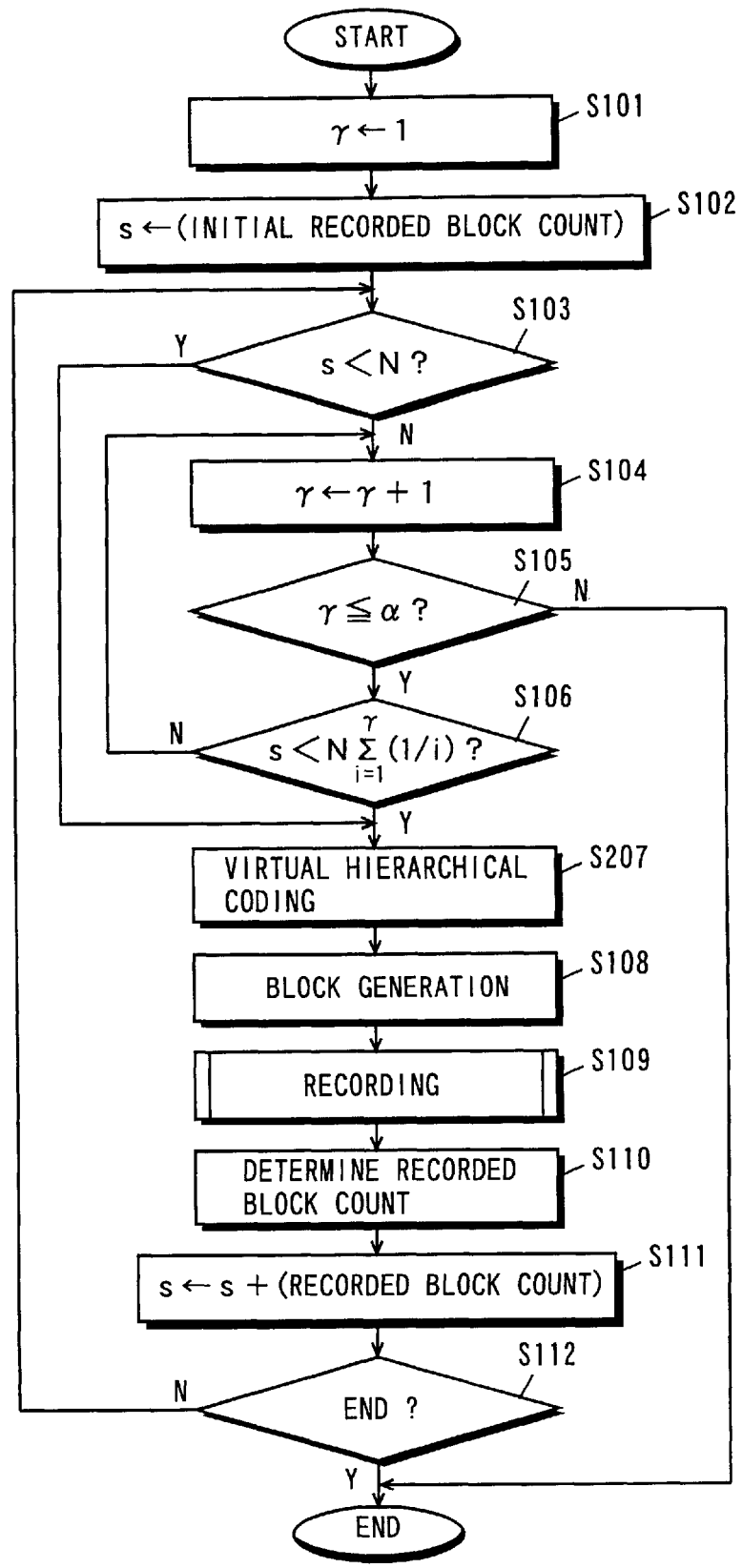
FIG. 14 is a flow chart used to describe the operation of the video and/or audio recording apparatus shown in FIG. 13.

FIG. 14 is a flow chart used to describe the operation of this preferred video and/or audio recording apparatus. The flow chart in FIG. 14 is substantially identical to that in FIG. 3, replacing step S107 in FIG. 3 with step S207.

Except for the hierarchizing process of step S207, the operation of this preferred video and/or audio recording apparatus is identical to the operation of a video and/or audio recording apparatus according to the first embodiment. Only how the operation of this preferred embodiment differs from that of the first embodiment is therefore described below.

The virtual hierarchical encoder 30 starts a process for hierarchizing input video and/or audio data in step S207 in FIG. 14.

This virtual hierarchizing performed by the virtual hierarchical encoder 30 in step S207 hierarchizes β layers (where β is the least common multiple of {α, α−1, α−2, . . . 3, 2}). That is, the input video and/or audio data is divided into β groups based on a priority level, and the groups are hierarchized such that the group with the highest priority becomes the least significant layer, and layer significance increases as priority decreases so that the group with the lowest priority becomes the most significant layer.

(Fifth Embodiment)

The functional and hardware configuration of a video and/or audio recording apparatus according to a fifth preferred embodiment of the present invention are identical to those of a video and/or audio recording apparatus according to the fourth embodiment above. Except for one part, the operation is also the same as that of the fourth embodiment.

This fifth embodiment differs from the fourth embodiment in the same manner in which the second embodiment differs from the first embodiment, and further description thereof is thus omitted below.

(Sixth Embodiment)

The functional and hardware configuration of a video and/or audio recording apparatus according to a sixth preferred embodiment of the present invention are identical to those of a video and/or audio recording apparatus according to the fourth embodiment above. Except for one part, the operation is also the same as that of the fourth embodiment.

This sixth embodiment differs from the fourth embodiment in the same manner in which the third embodiment differs from the first embodiment, and further description thereof is thus omitted below.

As will be known from the above descriptions, the above first to third embodiments of the present invention apply hierarchical coding and then record digital video and/or audio data, and the above fourth to sixth embodiments of the present invention apply virtual hierarchical coding and then record digital video and/or audio data. The seventh embodiment of the present invention described below, however, teaches a video and/or audio recording apparatus for recording digital video and/or audio data directly to a recording disc without first hierarchical coding or virtual hierarchical coding the data.

(Seventh Embodiment)

Figure 15:
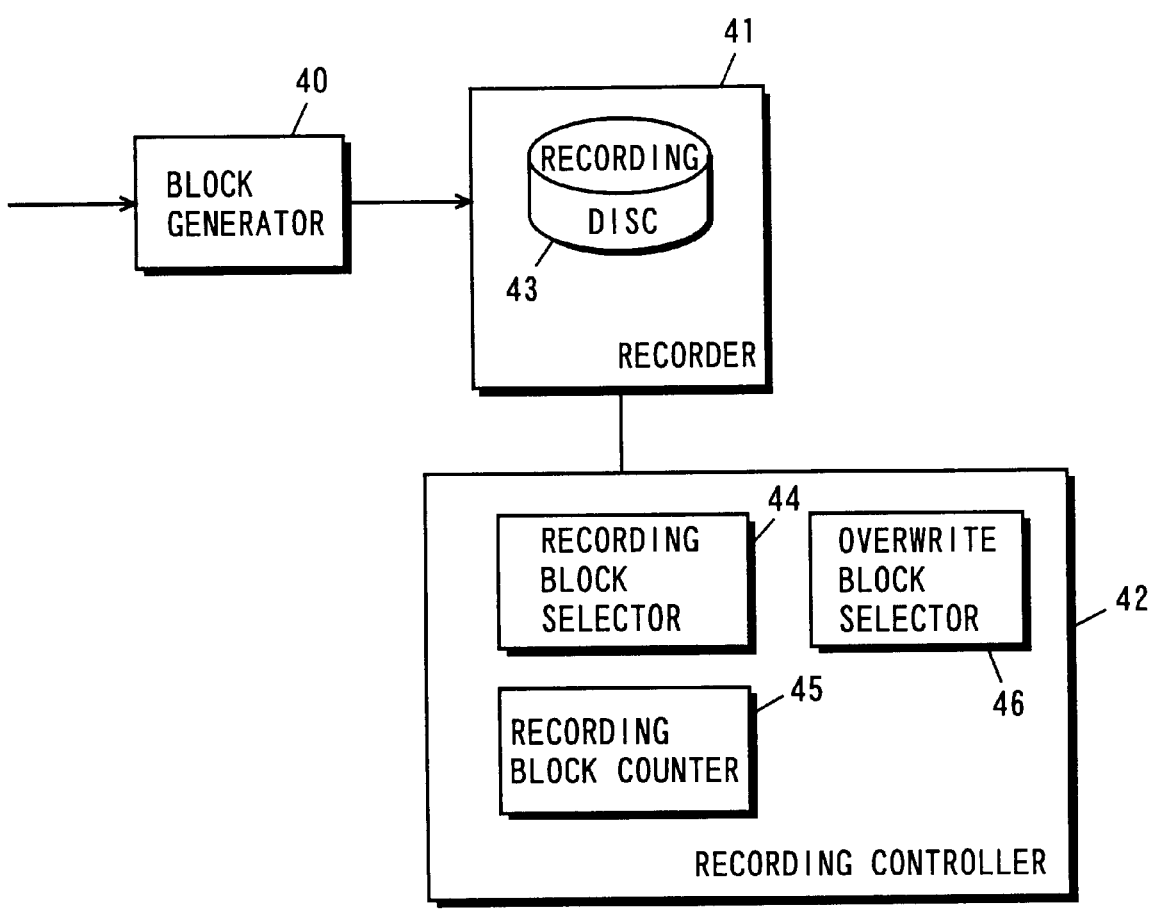
FIG. 15 is a function block diagram of a video and/or audio recording apparatus according to a seventh embodiment of the present invention.

FIG. 15 is a function block diagram of a video and/or audio recording apparatus according to a seventh embodiment of the present invention. As shown in FIG. 15, a video and/or audio recording apparatus according to this preferred seventh embodiment of the invention comprises a block generator 40, recorder 41, and recording controller 42.

The recorder 41 has a recording disc 43. The recording controller 42 has a recording block selector 44, recording block counter 45, and overwrite block selector 46.

The block generator 40 generates data blocks of a uniform size from input video and/or audio data.

The input video and/or audio data is compressed or uncompressed digital video and/or audio data.

The recorder 41 records the data blocks generated by the block generator 40 to the recording disc 43. The recording disc 43 is a rewritable, randomly accessible, disk type recording medium such as: a magnetic disk such as a floppy disk or hard disk; a Mini Disk (MD) or other magneto-optical (MO) disk; a CD-R, DVD-RAM, or other phase-change optical disk.

It should be noted that any other type of rewritable, randomly accessible recording medium which is recorded with an accompanying mechanical operation can be used for the recording disc 43.

The recording controller 42 controls the recorder 41.

That is, the recording block selector 44 of the recording controller 42 selects the data blocks generated by the block generator 40 to be recorded to the recording disc 43. These blocks are referred to below as the "recording blocks." The recording block counter 45 counts the number of blocks recorded to the recording disc 43 by the recorder 41. The overwrite block selector 46 has an overwrite block table (described further below), and refers to this overwrite block table to select the block or blocks to be overwritten (the overwrite blocks below) in the block sequence recorded to the recording disc 43. The recording controller 42 then controls the recorder 41 to record recording blocks by overwriting the selected overwrite blocks in sequence starting from a block near the beginning of the selected series of overwrite blocks.

The hardware configuration of the video and/or audio recording apparatus shown in FIG. 15 is as shown in FIG. 2.

A video and/or audio recording apparatus thus comprised generates blocks of a uniform size from the input video and/or audio data. The generated blocks are then linearly and contiguously recorded to the recording disc 43 in a first recording stage (recording stage 1) until the recording disc 43 is full. Once the recording disc 43 is full, the specific blocks to be recorded (that is, recording blocks) in a particular γth recording stage (where $\gamma=2, 3, \ldots \alpha$, and $\alpha$ is a desirable constant integer value of 2 or more) are selected, and the particular blocks to be overwritten (that is, the overwrite blocks) by the selected recording blocks are selected from the block sequence recorded to the recording disc 43. The selected recording blocks are then recorded by overwriting the selected overwrite blocks starting from an overwrite block near the beginning of the selected overwrite block sequence.

It will thus be obvious that this preferred video and/or audio recording apparatus differs from the video and/or audio recording apparatus according to the above first embodiment in that hierarchical coding is not used.

It will therefore also be obvious that, unlike in the above first embodiment, it is not necessary to consider a hierarchy when selecting the recording blocks and overwrite blocks, and the sequence in which blocks are recorded can be determined without reference to a hierarchy.

Figure 16:
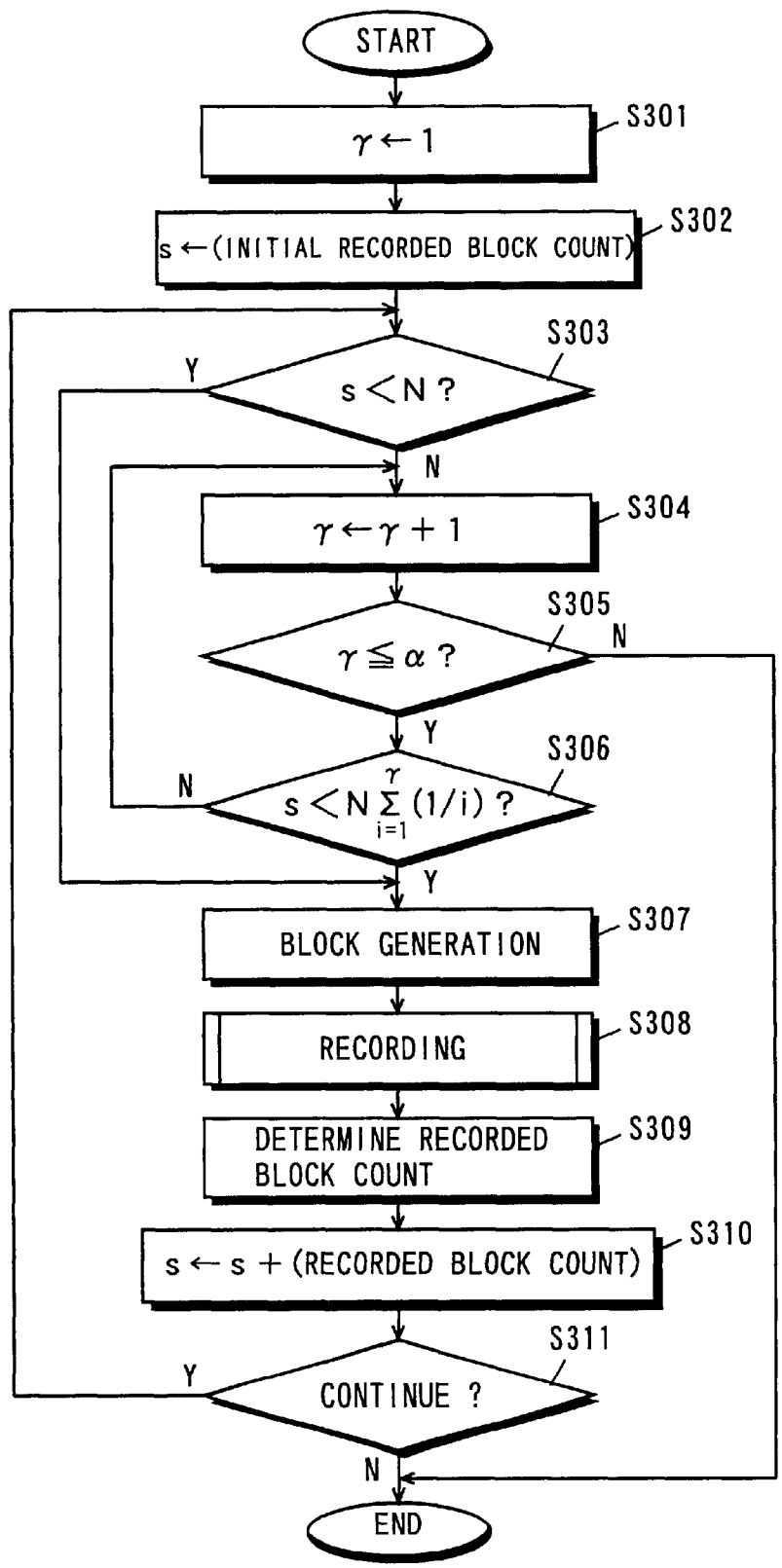
FIG. 16 is a flow chart used to describe the operation of the video and/or audio recording apparatus shown in FIG. 15.

FIG. 16 is a flow chart of the operation of a video and/or audio recording apparatus according to this preferred embodiment of the invention. The operation of this video and/or audio recording apparatus is described next below with reference to the flow chart in FIG. 16.

The recording controller 42 holds a threshold values where the value of a is predetermined based on the capacity of the recording disc 43. The number a of these threshold values is $\{N, N+N/2, N+N/2+N/3, \ldots, N+N/2+N/3+ \ldots +N/\alpha\}$ where N is the total number of blocks that can be recorded to the recording disc 43 without overwriting.

The recording controller 42 also stores the number of blocks recorded to the recording disc 43 by a previous operation (referred to below as the "initial recorded block count").

Referring to FIG. 16, the recording controller 42 first sets variable $\gamma \leftarrow 1$ (step S301), and variable $s \leftarrow$ the initial recorded block count (step S302). It then determines if s<N (step S303). If the result is yes, the recording controller 42 skips to step S307.

If the result of S303 is no, the recording controller 42 increments γ (that is, $\gamma \leftarrow \gamma+1$) (step S304), and then determines if $\gamma \leq \alpha$ (step S305). If the result is no, the operation stops.

However, if step S305 returns yes, the recording controller 42 determines if s is less than the sum (N+N/2+

N/3+ . . . +N/α) (step S306). If the result is yes, the recording controller 42 advances to step S307.

If S306 returns no, the recording controller 42 loops back to step S304 and repeats the same steps.

Next, the block generator 42 generates blocks of a uniform size from the input video and/or audio data (step S307).

The recording controller 40 then instructs the recorder 41 to begin a process for recording the blocks generated by the block generator 40 to the recording disc 43 (step S308).

Figure 17:
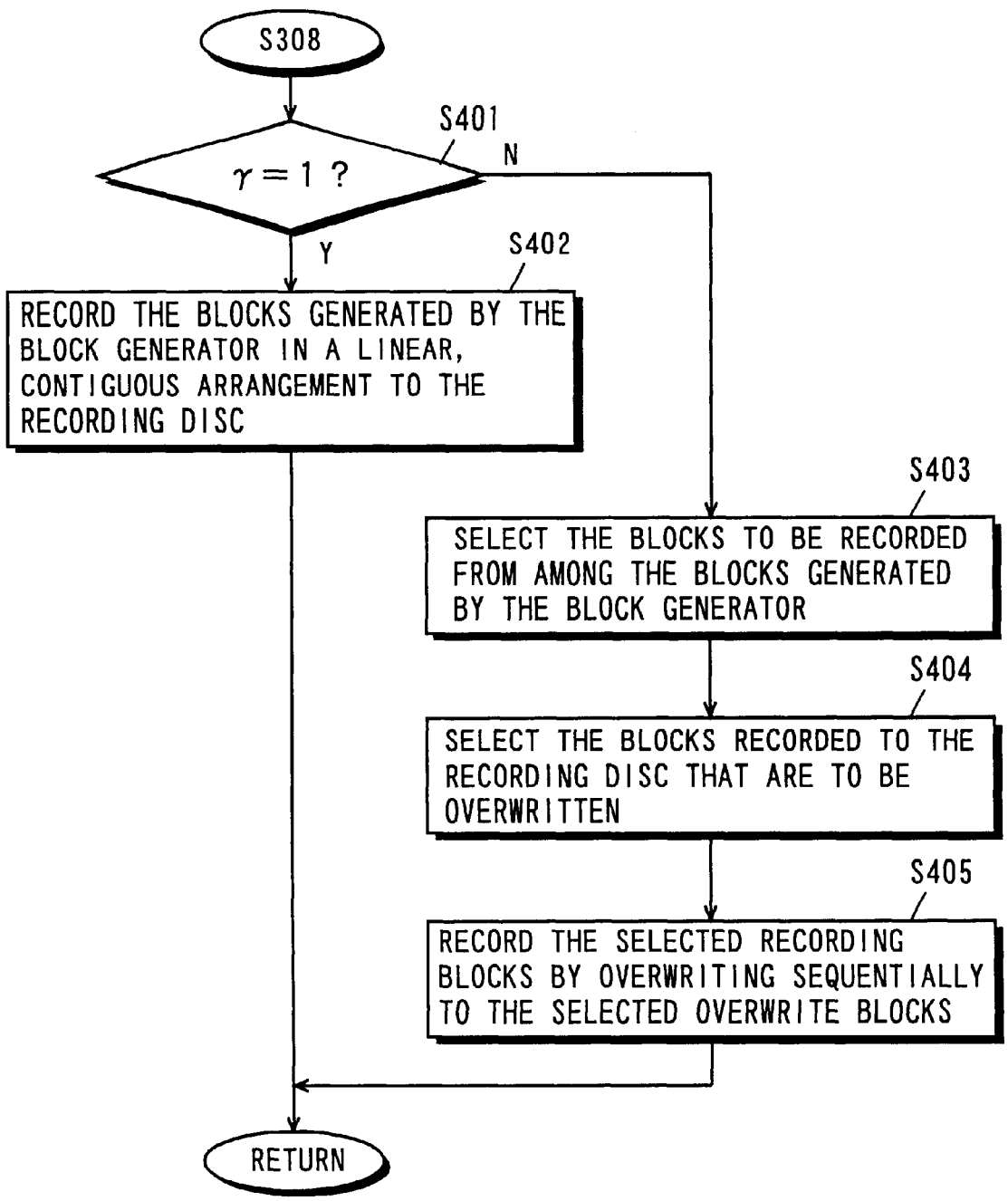
FIG. 17 is a flow chart showing details of the recording process shown as step S308 in FIG. 16.

FIG. 17 is a flow chart showing details of the recording process shown as step S308 in FIG. 16. The recording process shown as step S308 in FIG. 16 is described next below with reference to FIG. 17.

Referring to FIG. 17, the recording controller 42 first determines whether variable γ=1 (step S401). If yes, that is, γ=1, the recording controller 42 controls the recorder 41 to record the blocks generated by the block generator 40 in a linear, contiguous arrangement to the recording disc 43 (step S402). It should be noted that, unlike the process shown as step S202 in FIG. 4, the sequence in which blocks generated by the block generator 40 are recorded can be determined without reference to a hierarchy.

If the result of step S401 is no (that is, γ=2, 3, . . . α), the recording block selector 44 selects the specific blocks to be recorded from among the blocks generated by the block generator 40 (step S403). The manner in which blocks are selected in the step is described further below.

Next, the overwrite block selector 46 refers to an overwrite block table to select the specific blocks recorded to the recording disc 43 that are to be overwritten by the recording blocks selected in step S403 (step S404). Note that the overwrite block table referenced in this step, and which blocks are selected for overwriting, are also described further below.

The recording controller 42 then controls the recorder 41 to record the recording blocks selected by the recording block selector 44 by overwriting those blocks to the overwrite blocks selected by the overwrite block selector 46 in sequence from a block near the beginning of the sequence of selected overwrite blocks (step S405). Note that the sequence in which recording blocks are recorded can be determined without reference to a hierarchy.

This completes the recording process shown as step S308 in FIG. 16.

Referring again to FIG. 16, the recording block counter 45 then counts the number of blocks recorded to the recording disc 43 by the recorder 41 in step S308, and thus obtains a recorded block count (step S309). Variable s is then set as s←(s+recorded block count) (step S310).

It should be noted that the value of s obtained in step S310 is indicative of the total number of blocks recorded by the recorder 41 to the recording disc 43 up to that point in time, including the number of blocks that were recorded but then lost by overwriting.

Next, the recording controller 42 determines whether video and/or audio data is still being input to the block generator 40 (step S311). If the result is no, operation ends.

If the result of S311 is yes, the recording controller 42 returns to step S303. Variable γ is then incremented as the loop repeats. The process ends when step S305 returns no, that is, when γ>α.

The manner in which the blocks are selected as the recording blocks and the overwrite blocks in the recording process shown as step S308 in FIG. 16 are described next with reference to FIG. 18 to FIG. 20.

Figure 18:
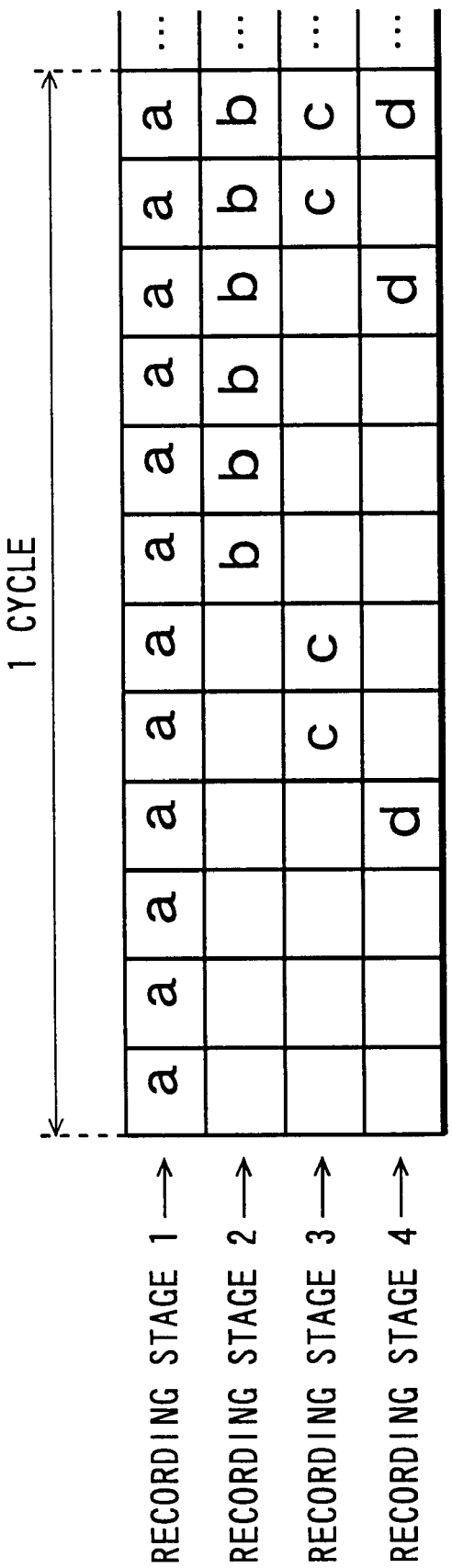
FIG. 18 is a typical diagram showing an exemplary arrangement of data blocks on a recording disc 43 obtained as a result of the recording process shown as step S308 in FIG. 16.
Figure 19:
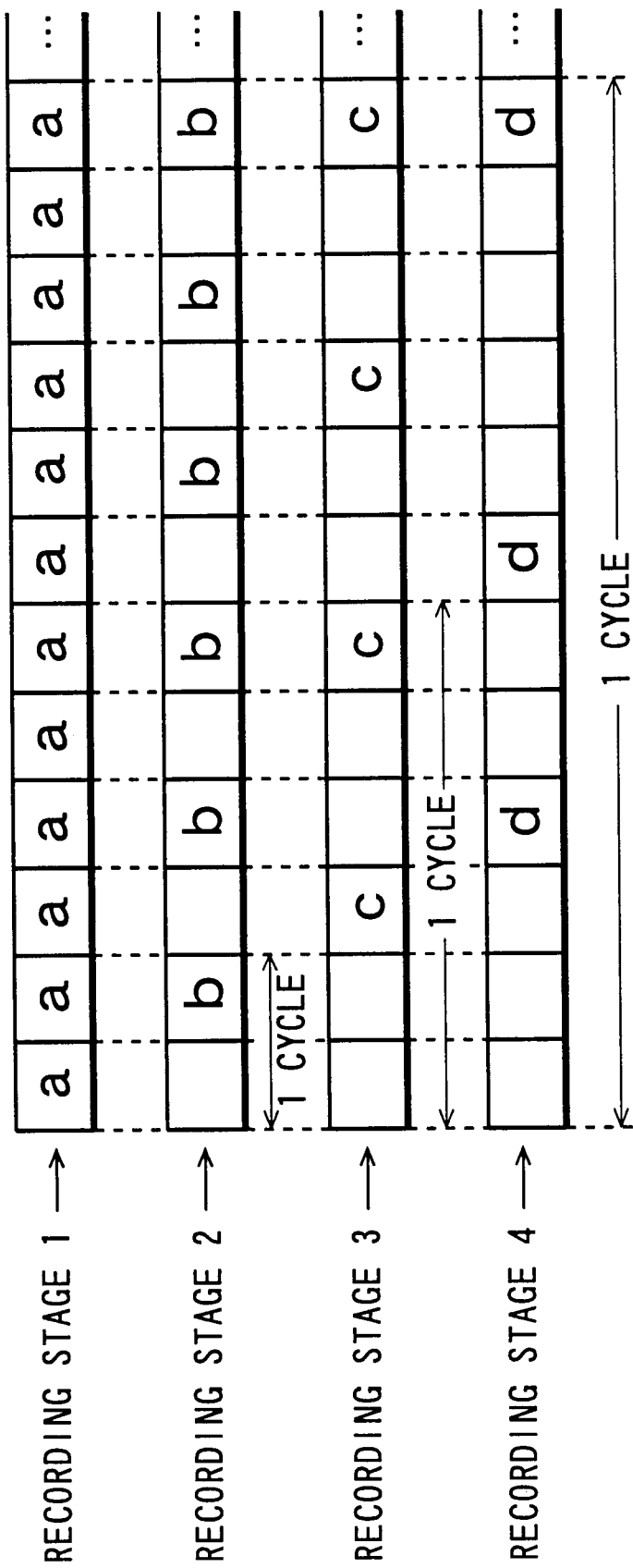
FIG. 19 is a typical diagram showing an alternative exemplary arrangement of data blocks on a recording disc 43 as a result of the recording process shown as step S308 in FIG. 16.
Figure 20:
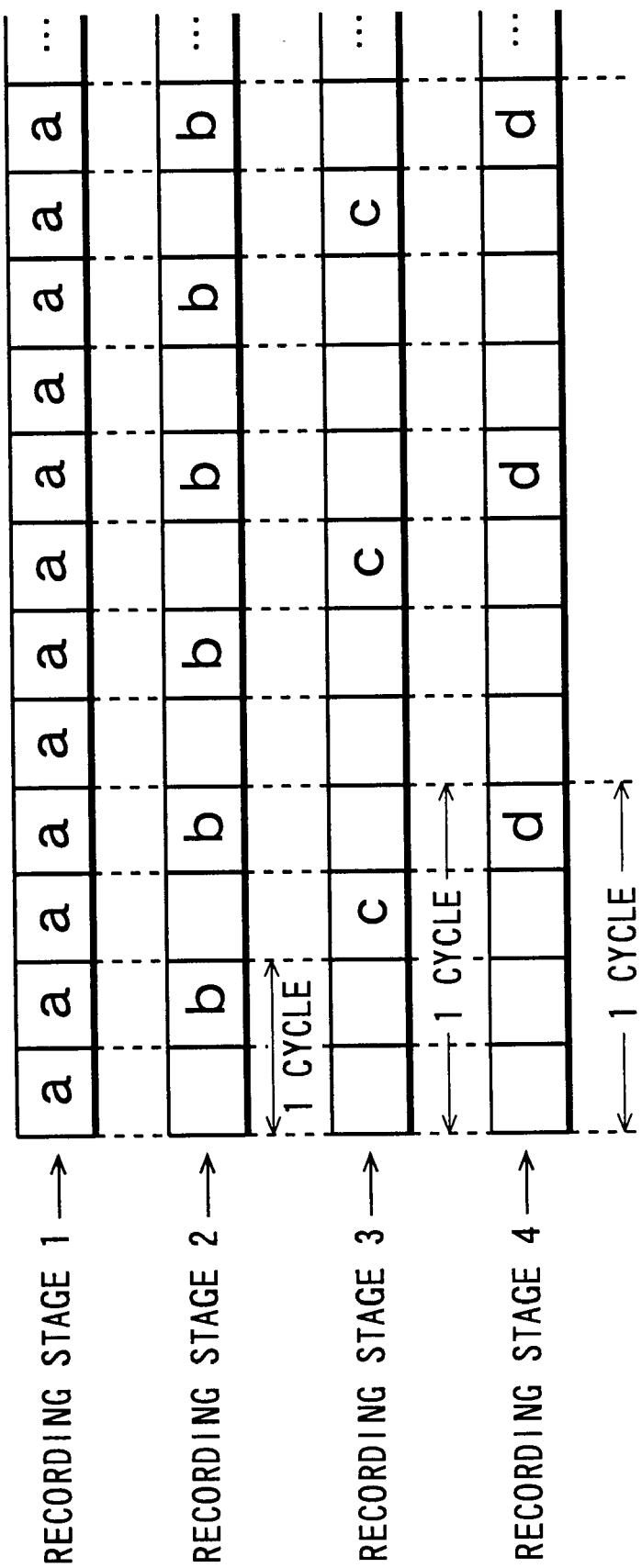
FIG. 20 is a typical diagram showing a further alternative exemplary arrangement of data blocks on a recording disc 43 obtained as a result of the recording process shown as step S308 in FIG. 16.
Figure 24:
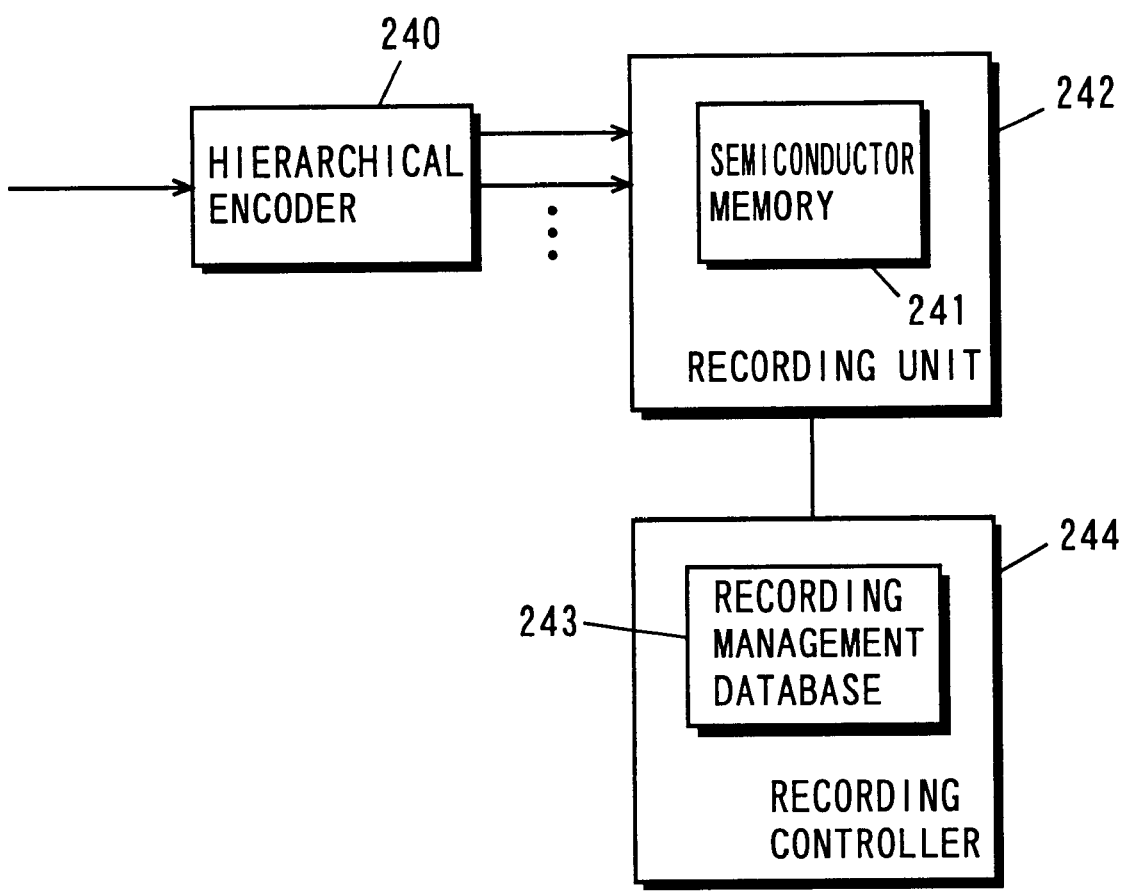
FIG. 24 is a block diagram showing an example of the essential components of a conventional audio recording apparatus.

FIG. 18 to FIG. 20 are tables showing some typical block arrangements on a recording disc 43 obtained by the recording process shown as step S308 in FIG. 16. Note that the arrangements shown in FIG. 18 to FIG. 20 are obtained when α=4.

Note, further, that in FIG. 18 to FIG. 20 "a" indicates a block recorded in recording stage 1, "b" indicates a block recorded in recording stage 2, "c" indicates a block recorded in recording stage 3, and "d" indicates a block recorded in recording stage 4.

In the case shown in FIG. 18, the overwrite blocks are selected based on a 12 block recording cycle in recording stages 2 to 4 (12 being the least common multiple of 2, 3, and 4).

More specifically, in recording stage 2 (γ=2), the recording block selector 44 selects 6 of 12 blocks generated by the block generator 40 as recording blocks, and the overwrite block selector 46 selects 6 blocks per cycle (that is, a sequence of 12 contiguous blocks) as the overwrite blocks in the block sequence on the recording disc 43. Note that insofar as this condition is satisfied, any blocks can be selected, and the invention shall not be limited to the exemplary selection of blocks shown in FIG. 18.

In recording stage 3 (γ=3), the recording block selector 44 selects 4 of 12 blocks generated by the block generator 40 as the recording blocks. The overwrite block selector 46 selects two blocks recorded in recording stage 1 and two blocks recorded in recording stage 2, for a total of 4 blocks in one recording cycle (that is, a sequence of 12 contiguous blocks), as the overwrite blocks in the block sequence on the recording disc 43. Note that insofar as this condition is satisfied, any blocks can be selected, and the invention shall not be limited to the exemplary selection of blocks shown in FIG. 18.

In recording stage 4 (γ=4), the recording block selector 44 selects 3 of 12 blocks generated by the block generator 40 as the recording blocks. The overwrite block selector 46 selects one block recorded in each of recording stages 1 to 3, for a total of 3 blocks in one recording cycle (that is, a sequence of 12 contiguous blocks), as the overwrite blocks in the block sequence on the recording disc 43. Note that insofar as this condition is satisfied, any blocks can be selected, and the invention shall not be limited to the exemplary selection of blocks shown in FIG. 18.

As will be known from the example shown in FIG. 18, by thus selecting recording blocks and overwrite blocks, the block sequence on the recording disc 43 at the completion of recording stage 2 evenly contains blocks recorded in recording stages 1 and 2; the block sequence on the recording disc 43 at the completion of recording stage 3 evenly contains blocks recorded in recording stages 1, 2, and 3; and the block sequence on the recording disc 43 at the completion of recording stage 4 evenly contains blocks recorded in recording stages 1, 2, 3 and 4.

In generalized terms, as will be known from the above description, when recording blocks are recorded in recording stage 1 until the recording disc 43 is filled, and are thereafter recorded to a recording stage γ (where γ=2, 3, . . . , α), the blocks can be recorded to recording stage γ in cycles of β consecutive blocks (where β is the least common multiple of {α, α-1, α-2, . . . , 2} by selecting a total of (β/γ) blocks, including (β/(γ(γ-1))) blocks in each recording stage 1 to (γ-1), as the overwrite blocks in one cycle (that is, β contiguous recorded blocks). As a result, the block sequence on the recording disc 43 at the completion of any recording stage γ will contain an equal number of blocks recorded in each recording stage 1 to γ.

In the alternative case shown in FIG. 19, overwrite blocks are selected where 2 blocks are 1 cycle recording cycle in recording stage 2. In recording stage 3, overwrite blocks are selected where 6 blocks are 1 cycle (6 being the least common multiple of 2 and 3). In recording stage 4, overwrite blocks are selected where 12 blocks, are 1 cycle (12 being the least common multiple of 2, 3 and 4).

In other words, in recording stage 2 ($\gamma=2$), the recording block selector 44 selects one of two blocks generated by the block generator 40 as a recording block, and the overwrite block selector 46 selects one block in each cycle (that is, two contiguous blocks) of the block sequence on the recording disc 43 as an overwrite block.

In recording stage 3 ($\gamma=3$), the recording block selector 44 selects 2 of 6 blocks generated by the block generator 40 as recording blocks. The overwrite block selector 46 selects one block recorded in recording stage 1 and one block recorded in recording stage 2, for a total of 2 blocks in one recording cycle (that is, 6 contiguous blocks), as the overwrite blocks in the block sequence on the recording disc 43.

In recording stage 4 ($\gamma=4$), the recording block selector 44 selects 3 of 12 blocks generated by the block generator 40 as recording blocks. The overwrite block selector 46 selects one block recorded in each of recording stages 1 to 3, for a total of 3 blocks in one recording cycle (that is, 12 contiguous blocks), as the overwrite blocks in the block sequence on the recording disc 43.

As will be known from the example shown in FIG. 19, by thus selecting recording blocks and overwrite blocks, the block sequence on the recording disc 43 at the completion of recording stage 2 evenly contains blocks recorded in recording stages 1 and 2; the block sequence on the recording disc 43 at the completion of recording stage 3 evenly contains blocks recorded in recording stages 1, 2, and 3; and the block sequence on the recording disc 43 at the completion of recording stage 4 evenly contains blocks recorded in recording stages 1, 2, 3 and 4.

In generalized terms, as will be known from the above description, the block sequence on the recording disc 43 at the completion of any recording stage $\gamma$ (where $\gamma=2, 3, \ldots, \alpha$) can be recorded to contain an equal number of blocks recorded in each recording stage 1 to $\gamma$ by defining the number of blocks in the recording block cycle in recording stage $\gamma$ as the least common multiple of the series $\{\gamma, \gamma-1, \gamma-2, \ldots, 2\}$, and selecting as the overwrite blocks a total of ($\gamma-1$) blocks, including one block recorded in each of recording stages 1 to ($\gamma-1$), in each period of the block sequence on the recording disc 43.

FIG. 20 shows a case in which at the completion of a recording stage$\gamma$ (where $\gamma=2, 3,$ or 4), the blocks recorded in each recording stage 1 to $\gamma$ are distributed at a regular interval in the block sequence on the recording disc 43. In this case, however, the block sequence on the recording disc 43 at the completion of recording stage 3 contains an unequal number of blocks recorded in recording stages 1 to 3.

The overwrite block tables referenced by the overwrite block selector for the block selection performed as step S404 in FIG. 17 is described next below.

FIG. 21 is an exemplary overwrite block table corresponding to the block arrangement shown in FIG. 18. Note that the overwrite table in FIG. 21 is identical to that in FIG. 10, and further description thereof is thus omitted below.

FIG. 22 is an exemplary overwrite block table corresponding to the block arrangement shown in FIG. 19. FIG. 22 shows that in recording stage 2 ($\gamma=2$), one recording cycle contains two consecutive blocks in the block sequence on the recording disc 43 when recording stage 1 is completed, and there is one overwrite block in each cycle, that is, the second block from the beginning of each cycle. In recording stage 3 ($\gamma=3$), one recording cycle contains six consecutive blocks in the block sequence on the recording disc 43 at the completion of recording stage 2, and there are two overwrite blocks in each cycle, that is, the third and sixth blocks from the beginning of each cycle. In recording stage 4 ($\gamma=4$), one recording cycle contains twelve consecutive blocks in the block sequence on the recording disc 43 at the completion of recording stage 3, and there are three overwrite blocks in each cycle, that is, the fourth, seventh, and twelfth blocks from the beginning of each cycle.

FIG. 23 is an exemplary overwrite block table corresponding to the block arrangement shown in FIG. 20. FIG. 23 shows that in recording stage 2 ($\gamma=2$), one recording cycle contains two consecutive blocks in the block sequence on the recording disc 43 when recording stage 1 is completed, and there is one overwrite block in each cycle, that is, the second block from the beginning of each cycle. In recording stage 3 ($\gamma=3$), one recording cycle contains four consecutive blocks in the block sequence on the recording disc 43 at the completion of recording stage 2, and there is one overwrite block in each cycle, that is, the third block from the beginning of each cycle. In recording stage 4 ($\gamma=4$), one recording cycle contains four consecutive blocks in the block sequence on the recording disc 43 at the completion of recording stage 3, and there is one overwrite block in each cycle, that is, the fourth block from the beginning of each cycle.

By thus selecting blocks at a predefined location in the block sequence on the recording disc 43 as the overwrite block, the overwrite blocks can be easily selected by referring to a stored predefined overwrite block table which indicates the position of the overwrite blocks in the block sequence by, for example, listing the ordinal number of the overwrite blocks from the beginning of the recorded block sequence.

Furthermore, by recording the blocks so that there is a periodicity to the location of the selected blocks, small overwrite block tables for a single cycle are sufficient.

As described above, this preferred embodiment of the present invention generates blocks of a uniform size from input video and/or audio data. The generated blocks are then recorded in a linear, consecutive sequence to a recording disc 43 until the recording disc 43 is filled to capacity. After the recording disc 43 is filled, the blocks to be recorded (that is, the recording blocks) are selected from among the generated blocks, and to be overwritten (that is, the overwrite blocks) are selected from the block sequence recorded to the recording disc 43. The selected recording blocks are then recorded by overwriting them to the selected overwrite blocks in sequence from an overwrite block near the beginning of the block sequence on the recording disc 43. This recording method according to the present preferred embodiment of the invention is referred to below as "fragmented overwrite recording."

It is therefore possible to achieve fragmented overwrite recording without an accompanying complicated mechanical operation even after the recording disc 43 becomes full.

Recording can therefore continue even if the recording disc 43 becomes full during the recording process, and interruptions in the reproduced video and/or audio are eliminated. Furthermore, if the recording disc 43 is not filled, high quality video and/or audio reproduction can be achieved.

More specifically, when recording blocks are recorded in recording stage 1 until the recording disc 43 is filled, and are thereafter recorded to a recording stage γ (where γ=2, 3, ..., α) the blocks can be recorded to recording stage γ in cycles of β consecutive blocks (where β is the least common multiple of {α, α−1, α−2, ..., 2} by selecting a total of (β/γ) blocks, including (β/(γ(γ−1))) blocks in each recording stage 1 to (γ−1), as the overwrite blocks in one cycle (that is, β contiguous recorded blocks). As a result, the block sequence on the recording disc 43 at the completion of any recording stage γ will contain an equal number of blocks recorded in each recording stage 1 to γ.

Alternatively, the block sequence on the recording disc 43 at the completion of any recording stage γ (where γ=2, 3, ..., α) can be recorded to contain an equal number of blocks recorded in each recording stage 1 to γ by defining the number of blocks in the recording block cycle in recording stage γ as the least common multiple of the series {γ, γ−1, γ−2, ..., 2}, and selecting as the overwrite blocks a total of (γ−1) blocks, including one block recorded in each of recording stages 1 to (γ−1), in each period of the block sequence on the recording disc 43.

By means of this recording method, the block sequence on the recording disc 43 at the completion of any γth recording stage will contain an equal number of blocks recorded in recording stages 1 to γ.

It is therefore possible to record video and/or audio data such that the quality of the reproduced video and/or audio gradually deteriorates as fragmented overwrite recording thus progresses from recording stage 1 to recording stage 2 and recording stage α, and the quality of the reproduced video and/or audio is the same in every recording stage irrespective of the recording stage at which fragmented overwrite recording ends in the range from recording stage 2 to recording stage α. In other words, if fragmented overwrite recording ends at recording stage γ, the quality of the video and/or audio reproduced for recording stage 1 to recording stage γ will be the same for every stage.

(Further preferred embodiments of the invention)

A first further preferred embodiment of the present invention is a video and/or audio recording and reproducing apparatus, and more specifically is a video and/or audio recording apparatus according to any of the first to third preferred embodiments above further comprising a reproducing section for reading, decoding, and reproducing video and/or audio data recorded to a recording disc. The reproducing section has an overwrite block table identical to that of the overwrite block selector, and refers to this table for reading blocks during reproduction A second further preferred embodiment of the present invention is a video and/or audio recording and reproducing apparatus, and more specifically is a video and/or audio recording apparatus according to any of the fourth to seventh preferred embodiments above further comprising a different reproducing section for reading and reproducing video and/or audio data recorded to a recording disc. The different reproducing section of this preferred embodiment has an overwrite block table identical to that of the overwrite block selector, and refers to this table during reproduction for reading blocks.

While the invention has been described in detail, the foregoing description is in all aspects illustrative and not restrictive. It is understood that numerous other modifications and variations can be devised without departing from the scope of the invention.

What is claimed is:
1. A video and/or audio recording apparatus for recording input video and/or audio data, said apparatus comprising:
a hierarchical coding means for hierarchically coding input video and/or audio data so that data in a bottom layer is independently decoded, and data in a layer other than the bottom layer is decoded by referring to lower layers;
a block generating means for generating a plurality of blocks of a uniform size from data in each hierarchically coded layer obtained by said hierarchical coding means;
a recording means for recording a block generated by said block generating means to a recording medium, the recording medium being rewritable, randomly accessible, accompanied by a mechanical operation in recording, and contained in said recording means; and
a recording control means for controlling said recording means;
wherein said recording control means:
until the recording medium becomes full, controls said recording means to record a plurality of blocks generated by said block generating means to the recording medium so that blocks are arranged in a linear and consecutive sequence; and
after the recording medium becomes full:
selects a plurality of lower layer blocks as blocks to be recorded from blocks generated by said block generating means;
selects a plurality of higher layer blocks from a block sequence on the recording medium as blocks to be overwritten; and
controls said recording means to record a lower layer block to be recorded by overwriting to a higher layer block to be overwritten in sequence from a block near a beginning of the block sequence;
controls said recording means to record a plurality of blocks in a sequence of β block cycles in a first recording stage until the recording medium becomes full, where β is the least common multiple of {α, α−1, α−2, ..., 2} and α is a desirable constant integer value of two or greater; and
in a γth recording stage (where γ=2, 3, ..., α) after the recording medium becomes full:
selects a block from layer 1 to layer (β/γ) when selecting a lower layer block as a block to be recorded from blocks generated by said block generating means;
selects a block from layer (β/γ+1) to layer (β/(γ−1)) when selecting a higher layer block from a block sequence on the recording medium as a block to be overwritten; and
when recording the lower layer block to be recorded by overwriting to the higher layer block to be overwritten in sequence from a block near a beginning of the block sequence, controls said recording means to record the layer 1 to layer (β/γ) blocks by overwriting to the layer (β/γ+1) to layer (β/(γ−1)) blocks in a sequence of (β/γ) block cycles.

2. The video and/or audio recording apparatus as claimed in claim 1, wherein said recording control means:
controls said recording means to record a plurality of blocks in a predetermined hierarchical sequence when recording blocks generated by said block generating means; and when selecting a higher layer block from a block sequence on the recording medium as a block to be overwritten, refers to an overwrite block table, the overwrite block table recording a location of a block to be overwritten in the block sequence.

3. The video and/or audio recording apparatus as claimed in claim 2, wherein the predetermined sequence has a cycle, and the overwrite block table records a location of a block to be overwritten in one cycle.

4. A video and/or audio recording apparatus for recording input video and/or audio data, said apparatus comprising:

a hierarchizing means for hierarchizing input video and/or audio data so that data of a highest priority is hierarchized to a bottom layer, and as data priority decreases, the data is hierarchized to a higher layer;

a block generating means for generating a plurality of blocks of a uniform size from data in each hierarchized layer obtained by said hierarchizing means;

a recording means for recording a block generated by said block generating means to a recording medium, the recording medium being rewritable, randomly accessible, accompanied by a mechanical operation in coding, and contained in said recording means; and a recording control means for controlling said recording means;

wherein said recording control means:
until the recording medium becomes full, controls said recording means to record a plurality of blocks generated by said block generating means to the recording medium so that blocks are arranged in a linear and consecutive sequence; and
after the recording medium becomes full:
selects a lower layer block as a block to be recorded from blocks generated by said block generating means;
selects a higher layer block from a block sequence on the recording medium as a block to be overwritten; and
controls said recording means to record a lower layer block to be recorded by overwriting to a higher layer block to be overwritten in sequence from a block near a beginning of the block sequence;
controls said recording means to record a plurality of blocks in a sequence of $\beta$ block cycles in a first recording stage until the recording medium becomes full, where $\beta$ is the least common multiple of $\{\alpha, \alpha-1, \alpha-2, \ldots, 2\}$ and $\alpha$ is a desirable constant integer value of two or greater; and
in a $\gamma$th recording stage (where $\gamma=2, 3, \ldots, \alpha$) after the recording medium becomes full:
selects a block from layer 1 to layer $(\beta/\gamma)$ when selecting a lower layer block as a block to be recorded from blocks generated by said block generating means;
selects a block from layer $(\beta/\gamma+1)$ to layer $(\beta/(\gamma-1))$ when selecting a higher layer block from a block sequence on the recording medium as a block to be overwritten; and
when recording the lower layer block to be recorded by overwriting to a higher layer block to be overwritten in sequence from a block near a beginning of the block sequence, controls said recording means to record the layer 1 to layer $(\beta/\gamma)$ blocks by overwriting to the layer $(\beta/\gamma+1)$ to layer $(\beta/(\gamma-1))$ blocks in a sequence of $(\beta/\gamma)$ block cycles.

5. The video and/or audio recording apparatus as claimed in claim 4, wherein said recording control means:
controls said recording means to record blocks in a predetermined hierarchical sequence when recording blocks generated by said block generating means; and
when selecting a higher layer block from a block sequence on the recording medium as a block to be overwritten, refers to an overwrite block table, the overwrite block table recording a location of a block to be overwritten in block sequence.

6. The video and/or audio recording apparatus as claimed in claim 5, wherein the predetermined sequence has a cycle, and the overwrite block table records a location of a block to be overwritten in one cycle.

7. A video and/or audio recording apparatus for recording input video and/or audio data, said apparatus comprising:

a block generating means for generating a plurality of blocks of a uniform size from input video and/or audio data;

a recording means for recording a block generated by said block generating means to a recording medium, the recording medium being rewritable, randomly accessible, accompanied by a mechanical operation in recording, and contained in said recording means; and a recording control means for controlling said recording means;

wherein said recording control means:
until the recording medium becomes full, controls said recording means to record a plurality of blocks generated by said block generating means to the recording medium so that blocks are arranged in a linear and consecutive sequence; and
after the recording medium becomes full:
selects a block to be recorded from blocks generated by said block generating means;
selects a block from a block sequence on the recording medium as a block to be overwritten; and
controls said recording means to record a block to be recorded by overwriting to a block to be overwritten in sequence from a block near a beginning of the block sequence; and
wherein when selecting a block from a block sequence on the recording medium as a block to be overwritten in a $\gamma$th recording stage (where $\gamma=2, 3, \ldots, \alpha$; and $\alpha$ is a desirable constant integer value of two or greater) after the recording medium becomes full in a first recording stage, said recording control means selects a total of $(\beta/\gamma)$ blocks, including $(\beta/(\gamma(\gamma-1)))$ blocks recorded in each recording stage 1 to $(\gamma-1)$ as overwrite blocks in each cycle of $\beta$ blocks, where $\beta$ is the least common multiple of $\{\alpha, \alpha-1, \alpha-2, \ldots, 2\}$.

8. The video and/or audio recording apparatus as claimed in claim 7, wherein said recording control means, when selecting a block from a block sequence on the recording medium as a block to be overwritten, refers to an overwrite block table, the overwrite block table recording a location of a block to be overwritten in the block sequence.

9. The video and/or audio recording apparatus as claimed in claim 8, wherein the location of a block to be overwritten has a cycle, and the overwrite block table records a location of a block to be overwritten in one cycle.

10. A video and/or audio recording apparatus for recording input video and/or audio data, said apparatus comprising:

a block generating means for generating a plurality of blocks of a uniform size from input video and/or audio data;

a recording means for recording a block generated by said block generating means to a recording medium, the recording medium being rewritable, randomly accessible, accompanied by a mechanical operation in recording, and contained in said recording means; and
a recording control means for controlling said recording means;
wherein said recording control means:
until the recording medium becomes full, controls said recording means to record a plurality of blocks generated by said block generating means to the recording medium so that blocks are arranged in a linear and consecutive sequence; and
after the recording medium becomes full:
selects a block to be recorded from blocks generated by said block generating means;
selects a block from a block sequence on the recording medium as a block to be overwritten; and
controls said recording means to record a block to be recorded by overwriting to a block to be overwritten in sequence from a block near a beginning of the block sequence; and
wherein when selecting a block from a block sequence on the recording medium as a block to be overwritten in a γth recording stage (where γ=2, 3, . . . , α; and α is a desirable constant integer value of two or greater) after the recording medium becomes full in a first recording stage, said recording control means selects a total of (γ−1) blocks, including 1 block in each recording stage 1 to (γ−1) as overwrite blocks in each cycle of blocks, where the number of blocks in each cycle is equal to the least common multiple of {α, α−1, α−2, . . . , 2}.

11. The video and/or audio-recording apparatus as claimed in claim 10, wherein said recording control means, when selecting a block from a block sequence on the recording medium as a block to be overwritten, refers to an overwrite block table, the overwrite block table recording a location of a block to be overwritten in the block sequence.

12. The video and/or audio recording apparatus as claimed in claim 11, wherein the location of a block to be overwritten has a cycle, and the overwrite block table records a location of a block to be overwritten in one cycle.

13. A video and/or audio recording apparatus for recording input video and/or audio data, said apparatus comprising:
a hierarchical coding device operable to hierarchically code input video and/or audio data so that data in a bottom layer is independently decoded, and data in a layer other than the bottom layer is decoded by referring to lower layers;
a block generating device operable to generate a plurality of blocks of a uniform size from data in each hierarchically coded layer obtained by said hierarchical coding device;
a recording device operable to record a block generated by said block generating device to a recording medium, the recording medium being rewritable, randomly accessible, accompanied by a mechanical operation in recording, and contained in said recording device; and
a recording control device operable to control said recording device;
wherein said recording control device is operable to:
until the recording medium becomes full, control said recording device to record a plurality of blocks generated by said block generating device to the recording medium so that blocks are arranged in a linear and consecutive sequence; and
after the recording medium becomes full:
select a plurality of lower layer blocks as blocks to be recorded from blocks generated by said block generating device;
select a plurality of higher layer blocks from a block sequence on the recording medium as blocks to be overwritten; and
control said recording device to record a lower layer block to be recorded by overwriting to a higher layer block to be overwritten in sequence from a block near a beginning of the block sequence;
control the recording device to record a plurality of blocks in a sequence of β block cycles in a first recording stage until the recording medium becomes full, where β is the least common multiple of {α, α−1, α−2, . . . , 2} and α is a desirable constant integer value of two or greater; and
in a γth recording stage (where γ=2, 3, . . . , α) after the recording medium becomes full:
select a block from layer 1 to layer (β/γ) when selecting a lower layer block as a block to be recorded from blocks generated by said block generating device;
select a block from layer (β/γ+1) to layer (β/(γ−1)) when selecting a higher layer block from a block sequence on the recording medium as a block to be overwritten; and
when recording the lower layer block to be recorded by overwriting to the higher layer block to be overwritten in sequence from a block near a beginning of the block sequence, control said recording device to record the layer 1 to layer (β/γ) blocks by overwriting to the layer (β/γ+1) to layer (β/(γ−1)) blocks in a sequence of (β/γ) block cycles.

14. The video and/or audio recording apparatus as claimed in claim 13, wherein said recording control device is operable to:
control said recording device to record a plurality of blocks in a predetermined hierarchical sequence when recording blocks generated by said block generating device; and
when selecting a higher layer block from a block sequence on the recording medium as a block to be overwritten, refer to an overwrite block table, the overwrite block table recording a location of a block to be overwritten in the block sequence.

15. The video and/or audio recording apparatus as claimed in claim 14, wherein the predetermined sequence has a cycle, and the overwrite block table records a location of a block to be overwritten in one cycle.

16. A video and/or audio recording apparatus for recording input video and/or audio data, said apparatus comprising:
a hierarchizing device operable to hierarchize input video and/or audio data so that data of a highest priority is hierarchized to a bottom layer, and as data priority decreases, the data is hierarchized to a higher layer;
a block generating device operable to generate a plurality of blocks of a uniform size from data in each hierarchized layer obtained by said hierarchizing device;
a recording device operable to record a block generated by said block generating device to a recording medium, the recording medium being rewritable, randomly accessible, accompanied by a mechanical operation in coding, and contained in said recording device; and a recording control device operable to control said recording device;

wherein said recording control device is operable to:
  until the recording medium becomes full, control said recording device to record a plurality of blocks generated by said block generating device to the recording medium so that blocks are arranged in a linear and consecutive sequence; and
  after the recording medium becomes full:
    select a lower layer block as a block to be recorded from blocks generated by said block generating device;
    select a higher layer block from a block sequence on the recording medium as a block to be overwritten; and
    control said recording device to record a lower layer block to be recorded by overwriting to a higher layer block to be overwritten in sequence from a block near a beginning of the block sequence;
  control said recording device to record a plurality of blocks in a sequence of $\beta$ block cycles in a first recording stage until the recording medium becomes full, where $\beta$ is the least common multiple of $\{\alpha, \alpha-1, \alpha-2, \ldots, 2\}$ and $\alpha$ is a desirable constant integer value of two or greater; and
  in a $\gamma$th recording stage (where $\gamma=2, 3, \ldots, \alpha$) after the recording medium becomes full:
    select a block from layer 1 to layer $(\beta/\gamma)$ when selecting a lower layer block as a block to be recorded from blocks generated by said block generating device;
    select a block from layer $(\beta/\gamma+1)$ to layer $(\beta/(\gamma-1))$ when selecting a higher layer block from a block sequence on the recording medium as a block to be overwritten; and
    when recording the lower layer block to be recorded by overwriting to a higher layer block to be overwritten in sequence from a block near a beginning of the block sequence, control said recording device to record the layer 1 to layer $(\beta/\gamma)$ blocks by overwriting to the layer $(\beta/\gamma+1)$ to layer $(\beta/(\gamma-1))$ blocks in a sequence of $(\beta/\gamma)$ block cycles.

17. The video and/or audio recording apparatus as claimed in claim 16, wherein said recording control device is operable to:
  control said recording device to record blocks in a predetermined hierarchical sequence when recording blocks generated by said block generating device; and
  when selecting a higher layer block from a block sequence on the recording medium as a block to be overwritten, refer to an overwrite block table, the overwrite block table recording a location of a block to be overwritten in block sequence.

18. The video and/or audio recording apparatus as claimed in claim 17, wherein the predetermined sequence has a cycle, and the overwrite block table records a location of a block to be overwritten in one cycle.

19. A video and/or audio recording apparatus for recording input video and/or audio data, said apparatus comprising:
  a block generating device operable to generate a plurality of blocks of a uniform size from input video and/or audio data;
  a recording device operable to record a block generated by said block generating device to a recording medium, the recording medium being rewritable, randomly accessible, accompanied by a mechanical operation in recording, and contained in said recording device; and
  a recording control device operable to control said recording device;

wherein said recording control device is operable to:
  until the recording medium becomes full, control said recording device to record a plurality of blocks generated by said block generating device to the recording medium so that blocks are arranged in a linear and consecutive sequence; and
  after the recording medium becomes full:
    select a block to be recorded from blocks generated by said block generating device;
    select a block from a block sequence on the recording medium as a block to be overwritten; and
    control said recording device to record a block to be recorded by overwriting to a block to be overwritten in sequence from a block near a beginning of the block sequence; and
  wherein when selecting a block from a block sequence on the recording medium as a block to be overwritten in a $\gamma$th recording stage (where $\gamma=2, 3, \ldots, \alpha$; and $\alpha$ is a desirable constant integer value of two or greater) after the recording medium becomes full in a first recording stage, said recording control device is operable to select a total of $(\beta/\gamma)$ blocks, including $(\beta/(\gamma(\gamma-1)))$ blocks recorded in each recording stage 1 to $(\gamma-1)$ as overwrite blocks in each cycle of $\beta$ blocks, where $\beta$ is the least common multiple of $\{\alpha, \alpha-1, \alpha-2, \ldots, 2\}$.

20. The video and/or audio recording apparatus as claimed in claim 19, wherein said recording control device, when selecting a block from a block sequence on the recording medium as a block to be overwritten, refers to an overwrite block table, the overwrite block table recording a location of a block to be overwritten in the block sequence.

21. The video and/or audio recording apparatus as claimed in claim 20, wherein the location of a block to be overwritten has a cycle, and the overwrite block table records a location of a block to be overwritten in one cycle.

22. A video and/or audio recording apparatus for recording input video and/or audio data, said apparatus comprising:
  a block generating device operable to generate a plurality of blocks of a uniform size from input video and/or audio data;
  a recording device operable to record a block generated by said block generating device to a recording medium, the recording medium being rewritable, randomly accessible, accompanied by a mechanical operation in recording, and contained in said recording device; and
  a recording control device operable to control said recording device;

wherein said recording control device is operable to:
  until the recording medium becomes fill, control said recording device to record a plurality of blocks generated by said block generating device to the recording medium so that blocks are arranged in a linear and consecutive sequence; and
  after the recording medium becomes full:
    select a block to be recorded from blocks generated by said block generating device;
    select a block from a block sequence on the recording medium as a block to be overwritten; and
    control said recording device to record a block to be recorded byoverwriting to a block to be overwritten in sequence from a block near a beginning of the block sequence; and wherein when selecting a block from a block sequence on the recording medium as a block to be overwritten in a $\gamma$th recording stage (where $\gamma=2, 3, \ldots, \alpha$; and $\alpha$ is a desirable constant integer value of two or greater) after the recording medium becomes full in a first recording stage, said recording control device is operable to select a total of $(\gamma-1)$ blocks, including 1 block in each recording stage 1 to $(\gamma-1)$ as overwrite blocks in each cycle of blocks, where the number of blocks in each cycle is equal to the least common multiple of $\{\alpha, \alpha-1, \alpha-2, \ldots, 2\}$.

23. The video and/or audio recording apparatus as claimed in claim 22, wherein said recording control device, when selecting a block from a block sequence on the recording medium as a block to be overwritten, refers to an overwrite block table, the overwrite block table recording a location of a block to be overwritten in the block sequence.

24. The video and/or audio recording apparatus as claimed in claim 23, wherein the location of a block to be overwritten has a cycle, and the overwrite block table records a location of a block to be overwritten in one cycle.

* * * * *